US012109543B2

(12) United States Patent
Miller

(10) Patent No.: US 12,109,543 B2
(45) Date of Patent: *Oct. 8, 2024

(54) METHODS AND SYSTEMS FOR OPERATING A PUMP AT AN EFFICIENCY POINT

(71) Applicant: MARATHON PETROLEUM COMPANY LP, Findlay, OH (US)

(72) Inventor: Kyle E. Miller, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,757

(22) Filed: Dec. 22, 2022

(65) Prior Publication Data

US 2023/0129513 A1 Apr. 27, 2023

Related U.S. Application Data

(60) Continuation of application No. 17/894,537, filed on Aug. 24, 2022, now Pat. No. 11,565,221, which is a (Continued)

(51) Int. Cl.
*B01F 23/40* (2022.01)
*B01F 25/53* (2022.01)
(Continued)

(52) U.S. Cl.
CPC .............. *B01F 23/49* (2022.01); *B01F 25/53* (2022.01); *B01F 35/833* (2022.01); *B01F 2025/919* (2022.01)

(58) Field of Classification Search
CPC .... B01F 23/49; B01F 35/831; B01F 35/8311; G05D 11/132
See application file for complete search history.

(56) References Cited

U.S. PATENT DOCUMENTS 2,626,627 A 1/1953 Jung et al.
3,504,686 A 4/1970 Cooper et al.
(Continued)

FOREIGN PATENT DOCUMENTS

AU 2010241217 11/2010
AU 2013202839 5/2014
(Continued)

OTHER PUBLICATIONS

Alexandrakis et al.,"Marine Transportation for Carbon Capture and Sequestration (CCS)", Department of Civil and Environmental Engineering, Thesis, Massachusetts Institute of Technology, Jun. 2010.

(Continued)

*Primary Examiner* — Reinaldo Sanchez-Medina
(74) *Attorney, Agent, or Firm* — Womble Bond Dickinson (US) LLP

(57) ABSTRACT

Methods and systems of operating a pump at an efficiency point during an in-line blending operation. In an embodiment, such a method may include transporting a fluid from a tank to a pump through a first pipe. The method may include discharging, via the pump, the fluid at a specified flow rate through a second pipe. The method may include measuring a flow rate of the first portion of the fluid flowing from the main control valve through the mixing pipe. The method may include measuring a flow rate of the second portion of the fluid flowing through the spillback loop. The method may include determining a current pump efficiency point and operating the pump within a range of percentages of the best efficiency point.

30 Claims, 8 Drawing Sheets

Related U.S. Application Data division of application No. 17/856,529, filed on Jul. 1, 2022, now Pat. No. 11,559,774, which is a continuation-in-part of application No. 17/566,768, filed on Dec. 31, 2021, now Pat. No. 11,752,472, which is a continuation of application No. 17/247,880, filed on Dec. 29, 2020, now Pat. No. 11,247,184, which is a continuation-in-part of application No. 17/247,700, filed on Dec. 21, 2020, now Pat. No. 11,774,990, and a continuation-in-part of application No. 17/247,704, filed on Dec. 21, 2020, now Pat. No. 10,990,114.

(60) Provisional application No. 63/265,458, filed on Dec. 15, 2021, provisional application No. 63/265,425, filed on Dec. 15, 2021, provisional application No. 63/198,356, filed on Oct. 13, 2020, provisional application No. 62/705,538, filed on Jul. 2, 2020, provisional application No. 62/954,960, filed on Dec. 30, 2019.

(51) Int. Cl.

| | |
|---|---|
| ***B01F 35/83*** | (2022.01) |
| *B01F 25/00* | (2022.01) |

(56) References Cited

U.S. PATENT DOCUMENTS

| | | | | |
|---|---|---|---|---|
| 3,608,869 | A | 9/1971 | Woodle | |
| 4,320,775 | A | 3/1982 | Stirling et al. | |
| 4,420,008 | A | 12/1983 | Shu | |
| 4,488,570 | A | 12/1984 | Jiskoot | |
| 4,897,226 | A | 1/1990 | Hoyle et al. | |
| 4,964,732 | A | 10/1990 | Cadeo et al. | |
| 5,050,064 | A | 9/1991 | Mayhew | |
| 5,305,631 | A | 4/1994 | Whited | |
| 5,469,830 | A | 11/1995 | Gonzalez | |
| 5,533,912 | A | 7/1996 | Fillinger | |
| 5,873,916 | A | 2/1999 | Cemenska et al. | |
| 5,887,974 | A | 3/1999 | Pozniak | |
| 5,962,774 | A | 10/1999 | Mowry | |
| 5,993,054 | A | 11/1999 | Tan et al. | |
| 6,050,844 | A | 4/2000 | Johnson | |
| 6,186,193 | B1 | 2/2001 | Phallen et al. | |
| 6,328,877 | B1 | 12/2001 | Bushman | |
| 6,383,237 | B1 | 5/2002 | Langer et al. | |
| 6,427,384 | B1 | 8/2002 | Davis, Jr. | |
| 6,679,302 | B1 | 1/2004 | Mattingly et al. | |
| 6,719,921 | B2 | 4/2004 | Steinberger et al. | |
| 6,799,883 | B1 | 10/2004 | Urquhart et al. | |
| 7,032,629 | B1 | 4/2006 | Mattingly et al. | |
| 7,631,671 | B2 | 12/2009 | Mattingly et al. | |
| 7,749,308 | B2 | 7/2010 | McCully | |
| 7,810,988 | B2 | 10/2010 | Kamimura et al. | |
| 8,282,265 | B2 | 10/2012 | Breithhaupt | |
| 8,597,380 | B2 | 12/2013 | Buchanan | |
| 8,616,760 | B2 * | 12/2013 | Williams | B01F 35/8311 366/160.2 |
| 8,632,359 | B2 | 1/2014 | Grimm | |
| 8,748,677 | B2 | 6/2014 | Buchanan | |
| 9,038,855 | B2 | 5/2015 | Lurcott et al. | |
| 9,162,944 | B2 | 10/2015 | Bennett et al. | |
| 9,388,350 | B2 | 7/2016 | Buchanan | |
| 9,643,135 | B1 | 5/2017 | Mazzei et al. | |
| 10,261,279 | B1 | 4/2019 | Potter | |
| 10,833,434 | B1 | 11/2020 | Tassell, Jr. | |
| 10,990,114 | B1 | 4/2021 | Miller | |
| 11,125,391 | B2 | 9/2021 | Al Khowaiter et al. | |
| 11,132,008 | B2 | 9/2021 | Miller | |
| 11,247,184 | B2 | 2/2022 | Miller | |
| 11,416,012 | B2 | 8/2022 | Miller | |
| 11,559,774 | B2 | 1/2023 | Miller | |
| 11,565,221 | B2 | 1/2023 | Miller | |
| 11,596,910 | B2 | 3/2023 | Miller | |
| 11,607,654 | B2 | 3/2023 | Miller | |
| 11,662,750 | B2 | 5/2023 | Miller | |
| 11,752,472 | B2 | 9/2023 | Miller | |
| 11,794,153 | B2 | 10/2023 | Miller | |
| 11,920,504 | B2 | 3/2024 | Thobe | |
| 11,965,317 | B2 | 4/2024 | Jordan | |
| 11,988,336 | B2 | 5/2024 | Thobe | |
| 12,000,538 | B2 | 6/2024 | Thobe | |
| 12,006,014 | B1 | 6/2024 | Ernst | |
| 12,011,697 | B2 | 6/2024 | Miller | |
| 12,012,082 | B1 | 6/2024 | Pittman, Jr. | |
| 12,012,883 | B2 | 6/2024 | Thobe | |
| 12,043,361 | B1 | 7/2024 | Ernst | |
| 12,043,905 | B2 | 7/2024 | Ell | |
| 12,043,906 | B2 | 7/2024 | Ell | |
| 12,066,843 | B2 | 8/2024 | Miller | |
| 2002/0178806 | A1 | 12/2002 | Valentine | |
| 2003/0158630 | A1 | 8/2003 | Pham et al. | |
| 2003/0227821 | A1 | 12/2003 | Bae et al. | |
| 2004/0057334 | A1 | 3/2004 | Wilmer et al. | |
| 2004/0125688 | A1 | 7/2004 | Kelley et al. | |
| 2004/0249105 | A1 | 12/2004 | Nolte et al. | |
| 2005/0058016 | A1 | 3/2005 | Smith et al. | |
| 2005/0150820 | A1 | 7/2005 | Guo | |
| 2006/0278304 | A1 | 12/2006 | Mattingly | |
| 2007/0175511 | A1 * | 8/2007 | Doerr | G05D 11/132 208/370 |
| 2008/0115834 | A1 | 5/2008 | Geoffrion et al. | |
| 2009/0175738 | A1 | 7/2009 | Shaimi | |
| 2009/0183498 | A1 | 7/2009 | Uchida et al. | |
| 2009/0188565 | A1 | 7/2009 | Satake | |
| 2010/0031825 | A1 | 2/2010 | Kemp | |
| 2010/0198775 | A1 | 8/2010 | Rousselle | |
| 2012/0027298 | A1 | 2/2012 | Dow | |
| 2013/0048094 | A1 | 2/2013 | Ballantyne | |
| 2014/0133824 | A1 | 5/2014 | Yoel | |
| 2014/0194657 | A1 | 7/2014 | Wadhwa et al. | |
| 2015/0269288 | A1 | 9/2015 | Moore | |
| 2016/0071059 | A1 | 3/2016 | Petering | |
| 2017/0131728 | A1 | 5/2017 | Lambert et al. | |
| 2017/0248569 | A1 | 8/2017 | Lambert et al. | |
| 2017/0259229 | A1 | 9/2017 | Chou et al. | |
| 2017/0326474 | A1 | 11/2017 | Olovsson | |
| 2018/0002617 | A1 | 1/2018 | Umansky et al. | |
| 2018/0098137 | A1 | 4/2018 | Saha | |
| 2018/0218214 | A1 | 8/2018 | Pestun | |
| 2018/0223202 | A1 | 8/2018 | Fransham et al. | |
| 2018/0312391 | A1 | 11/2018 | Borg | |
| 2019/0121373 | A1 | 4/2019 | Panigrahi | |
| 2019/0136060 | A1 | 5/2019 | Helgason et al. | |
| 2019/0338203 | A1 | 11/2019 | Umansky et al. | |
| 2019/0359899 | A1 | 11/2019 | Umansky et al. | |
| 2019/0362147 | A1 | 11/2019 | Adam | |
| 2019/0367732 | A1 | 12/2019 | Helgason et al. | |
| 2020/0118413 | A1 | 4/2020 | Kanukurthy et al. | |
| 2020/0240588 | A1 | 7/2020 | Al Khowaiter | |
| 2021/0197151 | A1 | 7/2021 | Miller | |
| 2021/0232163 | A1 | 7/2021 | Miller | |
| 2022/0001969 | A1 | 1/2022 | Pugnetti | |
| 2022/0401899 | A1 | 12/2022 | Miller | |
| 2023/0333577 | A1 | 10/2023 | Miller | |
| 2023/0333578 | A1 | 10/2023 | Miller | |
| 2023/0347303 | A1 | 11/2023 | Miller | |
| 2023/0415106 | A1 | 12/2023 | Miller | |
| 2024/0060189 | A1 | 2/2024 | Ell | |
| 2024/0141506 | A1 | 5/2024 | Ell | |
| 2024/0166492 | A1 | 5/2024 | Thobe | |
| 2024/0209988 | A1 | 6/2024 | Thobe | |
| 2024/0217498 | A1 | 7/2024 | Pittman, Jr. | |
| 2024/0255102 | A1 | 8/2024 | Thobe | |
| 2024/0269626 | A1 | 8/2024 | Miller | |
| 2024/0271556 | A1 | 8/2024 | Thobe | |

FOREIGN PATENT DOCUMENTS

| | | |
|---|---|---|
| CA | 2447358 | 4/2005 |
| CA | 2702151 | 10/2007 |
| CA | 2637421 | 1/2010 |
| CA | 2642295 | 1/2010 |

(56) References Cited

FOREIGN PATENT DOCUMENTS

| | | | |
|---|---|---|---|
| CA | 2736733 | | 10/2011 |
| CA | 2958443 | | 4/2017 |
| CA | 2995532 | | 4/2017 |
| CA | 2916141 | | 6/2017 |
| CN | 2092562 | U | 1/1992 |
| CN | 200958686 | | 10/2007 |
| CN | 100348970 | | 11/2007 |
| CN | 102997052 | | 3/2013 |
| CN | 202898548 | U | 4/2013 |
| CN | 103106764 | | 5/2013 |
| CN | 103497804 | | 1/2014 |
| CN | 102997061 | | 5/2015 |
| CN | 204824775 | | 12/2015 |
| CN | 205640252 | | 10/2016 |
| CN | 104372350 | B | 2/2017 |
| CN | 106764463 | | 1/2019 |
| CN | 110513604 | | 11/2019 |
| CN | 210176958 | | 3/2020 |
| CN | 111537157 | | 8/2020 |
| CN | 114001278 | | 2/2022 |
| CN | 114877263 | | 4/2023 |
| EP | 2602609 | | 6/2013 |
| EP | 3076461 | | 10/2016 |
| EP | 3101411 | | 12/2016 |
| EP | 3112011 | | 1/2017 |
| EP | 2994626 | | 1/2018 |
| EP | 3285759 | | 2/2018 |
| ES | 2398302 | | 3/2013 |
| FR | 2388762 | | 11/1978 |
| FR | 2689241 | | 10/1993 |
| GB | 1179978 | | 2/1970 |
| GB | 2097687 | | 11/1982 |
| GB | 2545207 | | 6/2017 |
| GB | 2559149 | | 4/2022 |
| IN | 202141001384 | | 1/2021 |
| IT | 201900008235 | | 12/2020 |
| JP | 2004125039 | | 4/2004 |
| JP | 2007204023 | | 8/2007 |
| JP | 2008097832 | | 4/2008 |
| JP | 2012002159 | | 11/2014 |
| JP | 2016078893 | | 5/2016 |
| KR | 20110010316 | | 2/2011 |
| KR | 20130038986 | | 4/2013 |
| KR | 102129951 | | 7/2020 |
| KR | 102169280 | | 10/2020 |
| KR | 102281640 | | 7/2021 |
| RU | 2760879 | | 12/2021 |
| WO | 1996006685 | | 5/1996 |
| WO | 1997006004 | | 2/1997 |
| WO | 1997006298 | | 2/1997 |
| WO | 1998003711 | | 1/1998 |
| WO | 2000063108 | | 10/2000 |
| WO | 2002030551 | | 4/2002 |
| WO | 2003003002 | | 1/2003 |
| WO | 2003066423 | | 8/2003 |
| WO | 2004003293 | | 1/2004 |
| WO | 2004092307 | | 10/2004 |
| WO | 2005018300 | | 3/2005 |
| WO | 2007107652 | | 9/2007 |
| WO | 2007112335 | | 10/2007 |
| WO | 2007149851 | | 12/2007 |
| WO | 2009013544 | | 1/2009 |
| WO | 2009055024 | | 4/2009 |
| WO | 2010042704 | | 4/2010 |
| WO | 2010103260 | | 9/2010 |
| WO | 2013112274 | | 8/2013 |
| WO | 2014089443 | | 6/2014 |
| WO | 2014173672 | | 10/2014 |
| WO | 2015061868 | | 5/2015 |
| WO | 2015153607 | | 10/2015 |
| WO | 2016004107 | | 1/2016 |
| WO | 2016026043 | | 2/2016 |
| WO | 2016146404 | | 9/2016 |
| WO | 2017074985 | | 5/2017 |
| WO | 2017083778 | | 5/2017 |
| WO | 2017087731 | | 5/2017 |
| WO | 2017152269 | | 9/2017 |
| WO | 2018005141 | | 1/2018 |
| WO | 2018102378 | | 6/2018 |
| WO | 2020044026 | | 3/2020 |
| WO | 2020118020 | | 6/2020 |
| WO | 2020132632 | | 6/2020 |
| WO | 2020223803 | | 11/2020 |
| WO | 2020237112 | | 11/2020 |
| WO | 2021062563 | | 4/2021 |
| WO | 2021100054 | | 5/2021 |
| WO | 2022043197 | | 3/2022 |
| WO | 2022126092 | | 6/2022 |
| WO | 2022149501 | | 7/2022 |
| WO | 2023287276 | | 1/2023 |
| WO | 2023038579 | | 3/2023 |
| WO | 2023137304 | | 7/2023 |
| WO | 2023164683 | | 8/2023 |
| ZA | 199606765 | | 2/1998 |
| ZA | 200610366 | | 1/2008 |

OTHER PUBLICATIONS

Datta et al., "Advancing carbon management through the global commoditization of CO2: the case for dual-use LNG-CO2 shipping", Carbon Management, 2020, vol. 11, No. 6, 611-630.
Ibitoye et al., "Poster Abstract: A Convolutional Neural Network Based Solution for Pipeline Leak Detection", School of Information Technology, Carleton University, Ottawa, Canada, Nov. 2019.
IntelliView, "Thermal Imaging Provides Early Leak Detection in Oil and Gas Pipelines", Petro Industry News, www.Petro-Online.com, Aug./Sep. 2018.
Southwest Research Institute, "Methane Leak Detection", 2021.
Lloyd's Register, Using technology to trace the carbon intensity of sustainable marine fuels, Feb. 15, 2023.
Information Disclosure Declaration by Kyle E. Miller, Dec. 18, 2020.
Neutrik XXR-2 XX Series, https://www.parts-express.com/Neutrik-XXR-2-XX-Series-Color-Coding_Ring-Red, 2022.
Hou, Qingmin, An FBG Strain Sensor-Based NPW Method for Natural Gas Pipeline Leakage Detection, Hindawi, Mathematical Problems in Engineering,vol. 2021, Article ID 5548503, pp. 1-8.
Cott Manufacturing Company, FinkLet®/FinkPlate® Cathodic Proection Test Stations, Wayback Machine, May 22, 2000.
Skelton et al., Onboard Refueling Vapor Recovery Systems Analysis of Widespread Use,Nescaum, Boston MA, Aug. 20, 2007.
Membrane Technology and Research, Inc., Gasoline Vapor Recovery, 2018.
Jordan Technologies, Aereon, Recovering More Vapor = Increased Profits, 2015.
EPFL, Capturing CO2 from trucks and reducing their emissions by 90%, Dec. 23, 2019.
Sharma, Shivom et al., Carbon Dioxide Capture from Internal Combustion Engine Exhaust Using Temperature Swing Adsorption, Front. Energy Res., Sec. Carbon Capture, Utilization and Storage, Dec. 16, 2019.
International Search Report and Written Opinion for international application No. PCT/US2024/021099 mailed on Aug. 2, 2024.

* cited by examiner

METHODS AND SYSTEMS FOR OPERATING A PUMP AT AN EFFICIENCY POINT

CROSS-REFERENCE TO RELATED APPLICATIONS

This application is a continuation of U.S. Non-Provisional application Ser. No. 17/894,537, filed Aug. 24, 2022, titled "METHODS AND SYSTEMS FOR OPERATING A PUMP AT AN EFFICIENCY POINT", which is a divisional of U.S. Non-Provisional application Ser. No. 17/856,529, filed Jul. 1, 2022, titled "METHODS AND SYSTEMS FOR OPERATING A PUMP AT AN EFFICIENCY POINT", which claims priority to and the benefit of U.S. Application No. 63/265,425, filed Dec. 15, 2021, titled "METHODS AND SYSTEMS FOR OPERATING A PUMP AT AN EFFICIENCY POINT", and U.S. Application No. 63/265,458, filed Dec. 15, 2021, titled "METHODS AND SYSTEMS FOR IN-LINE MIXING OF HYDROCARBON LIQUIDS", the disclosures of which are incorporated herein by reference in their entireties. U.S. Non-Provisional application Ser. No. 17/856,529 is also a Continuation-in-Part of U.S. application Ser. No. 17/566,768, filed Dec. 31, 2021, titled "METHODS AND SYSTEMS FOR SPILLBACK CONTROL OF IN-LINE MIXING OF HYDROCARBON LIQUIDS", which is a continuation of U.S. application Ser. No. 17/247,880, filed Dec. 29, 2020, titled "METHODS AND SYSTEMS FOR INLINE MIXING OF HYDROCARBON LIQUIDS BASED ON DENSITY OR GRAVITY", now U.S. Pat. No. 11,247,184, issued Feb. 15, 2022, which is a Continuation-in-Part of U.S. application Ser. No. 17/247,700, filed Dec. 21, 2020, titled "METHODS AND SYSTEMS FOR INLINE MIXING OF HYDROCARBON LIQUIDS BASED ON DENSITY OR GRAVITY", which claims priority to and the benefit of U.S. Provisional Application No. 63/198,356, filed Oct. 13, 2020, titled "METHODS AND SYSTEMS FOR INLINE MIXING OF PETROLEUM LIQUIDS," U.S. Provisional Application No. 62/705,538, filed Jul. 2, 2020, titled "METHODS AND SYSTEMS FOR INLINE MIXING OF PETROLEUM LIQUIDS", and U.S. Provisional Application No. 62/954,960, filed Dec. 30, 2019, titled "METHOD AND APPARATUS FOR INLINE MIXING OF HEAVY CRUDE", the disclosures of which are incorporated herein by reference in their entirety. U.S. application Ser. No. 17/247,880 is also a Continuation-in-Part of U.S. application Ser. No. 17/247,704, filed Dec. 21, 2020, titled "METHODS AND SYSTEMS FOR INLINE MIXING OF HYDROCARBON LIQUIDS", now U.S. Pat. No. 10,990,114, issued Apr. 27, 2021, which claims priority to and the benefit of U.S. Provisional Application No. 63/198,356, filed Oct. 13, 2020, titled "METHODS AND SYSTEMS FOR INLINE MIXING OF PETROLEUM LIQUIDS", U.S. Provisional Application No. 62/705,538, filed Jul. 2, 2020, titled "METHODS AND SYSTEMS FOR INLINE MIXING OF PETROLEUM LIQUIDS", and U.S. Provisional Application No. 62/954,960, filed Dec. 30, 2019, titled "METHOD AND APPARATUS FOR INLINE MIXING OF HEAVY CRUDE", the disclosures of which are incorporated herein by reference in their entireties.

FIELD OF DISCLOSURE

The disclosure herein relates to systems and methods for operating a pump at an efficiency point, and one or more embodiments of such systems and methods operate a pump of an in-line mixing system at a preselected range of percentages of a best efficiency point.

BACKGROUND

Different types of hydrocarbon liquids, such as petroleum and renewable liquid products (e.g., such as crude oil), are often mixed upstream of a refinery to reduce the viscosity of heavy crude and maximize capacity, or to create a desired set of properties (TAN, sulfur, etc.). Given the multitude of crude types, the potential mixtures and component ratios are numerous. In some situations, multiple different types of hydrocarbon liquids, e.g., crude oil and renewable products, from different tanks may need to be mixed in a particular ratio. Further, there may also be a need to create a desired mixture on demand and ship the mixture through a pipeline as one homogenous product. In such examples, the mixing of different types of hydrocarbon liquid, e.g., crude and renewable liquid, may be performed at a pipeline origination station. Often, the pipeline origination station may include a tank farm (e.g., having multiple tanks for storage and mixing of the crude oils) and extensive piping capable of transporting hydrocarbon liquids from each of the tanks to one or more mainline booster pumps, which raise the hydrocarbon liquids to high pressures for traveling on a long pipeline.

Historically, crude mixing occurred by blending the crude oils in one or more tanks. Tank mixing is the most common form of crude mixing in the oil and gas industry. While relatively inexpensive, such methods have several undesirable drawbacks. For example, the extent and/or accuracy of the mixing may be less precise (e.g., having an error rate of +/− about 10% based on a target set point). Such methods typically require an entire tank to be dedicated to blending the crude oils along with separate distribution piping therefrom. In addition, the mixed crude product tends to stratify in the tank without the use of tank mixers, which also require additional capital investment. Further, the mixed crude product is generally limited to a 50/50 blend ratio.

An alternative to tank mixing is parallel mixing, which uses two pumps to pump two controlled feed streams (e.g., one pump per feed stream) on demand from separate tanks and into the pipeline. While parallel mixing is typically more precise than tank mixing, it is also more difficult to control because both streams are pumped by booster pumps into a common stream. Typically, the two pumped streams are individually controlled by variable speed pumps or pumps with flow control valves; therefore, the two sets of independent controls may interfere with each other and/or may have difficulty reaching steady state if not programmed correctly.

Applicant has recognized, however, that in parallel mixing operations, both streams need to be boosted to about 50-200 psi of pressure in the tank farm to provide adequate suction pressure to a mainline booster pump that is positioned downstream of the boosters. Even if one stream operates at a fixed flow while the other varies, the need to boost the pressure of each stream to about 50-200 psi may require high horsepower boost pumps dedicated to each line. Such dedicated pumps may be needed to supply streams at adequate pressure to the mainline pumps and may require significant capital investment. From a commercial standpoint, for example, parallel mixing operations require much more infrastructure, representing a 180% to 200% increase in cost difference compared to the in-line mixing systems disclosed herein.

Further, pumps utilized at such sites may not be operated in consideration of each pumps best efficiency point. Further still, there is no current system or method to adjust pump operation based on the best efficiency point or adjust pump operation if the best efficient point changes over time.

Therefore, there is a need in the industry for accurate and cost-effective blending methods and systems for crude and other hydrocarbon liquid products, as well as for efficient operation of equipment at such tank farms.

SUMMARY

The disclosure herein provides embodiments of systems and methods for operating a pump at an efficiency point during an in-line blending operation. In particular, in one or more embodiments, the disclosure provides two or more tanks positioned at a tank farm. Such an embodiment of an in-line mixing system is positioned or configured to admix two or more of those hydrocarbon liquids contained within the two or more tanks to provide a blended mixture within a single pipeline. At least one of the tanks may be connected to a mixing pipe with a pump therebetween. During a blending operation, fluid flow from such a tank may vary for a variety of reasons (increased or decreased tank levels, viscosity changes, temperature changes, etc.). Further, the pump speed may be adjusted to ensure a target mix ratio is achieved. To ensure that the pump is operating within a preselected range of the best pump efficiency point, a spillback loop may be positioned around or about the pump, to divert a portion of the flow from the pump's outlet and re-direct the diverted portion of the flow back to the pump's inlet. As the flow of fluid from the tank varies, the amount of fluid diverted through the spillback loop may be increased or decreased to maintain operation within a preselected range of the best pump efficiency point. The amount of fluid may be controlled via adjustment of one or more of a spillback control valve, pump speed, or main control valve. The spillback control valve may control the amount of total fluid flowing through the spillback loop. The main control valve and the pump speed may control the amount of fluid flowing to a mixing pipe (e.g., where two or more hydrocarbon fluids may be admixed). Adjustment of one of these devices or components may cause the pump to operate at a different efficiency point, in addition to causing the mix ratio of the two or more hydrocarbon fluids to change. A controller may periodically adjust any one of the devices to drive the mix ratio to a specified mix ratio and to drive the pump to operate within a pre-selected percentage of the pump's best efficiency point.

Accordingly, an embodiment of the disclosure is directed to a method of operating a pump at an efficiency point during an in-line blending operation. The method may be performed or executed upon and/or during an initiation of an in-line blending operation. The method may include transporting a fluid from a tank to a pump through a first pipe. The method may include discharging, via the pump, the fluid at a specified flow rate through a second pipe. The second pipe may be connected to a main control valve and a spillback loop. The main control valve may be connected to a mixing pipe. The spillback loop may include a spillback control valve positioned thereon. A first portion of the fluid may flow through the main control valve and a second portion of the fluid may flow through the spillback loop. The first portion of the fluid and the second portion of the fluid may be based on the main control valve's open position and the spillback control valve's open position. The method may include measuring, via a main meter positioned along the mixing pipe, a flow rate of the first portion of the fluid flowing from the main control valve through the mixing pipe. The method may include measuring, via a spillback meter positioned along the spillback loop and prior to the spillback control valve, a flow rate of the second portion of the fluid flowing through the spillback loop. The method may include determining a current pump efficiency point based on a best efficiency point and current pump speed. The method may also include, in response to the current pump efficiency point operating at less than about 40% to greater than about 120% of the best efficiency point, adjusting, to drive the pump to operate within greater than about 40% to less than about 120% of the best efficiency point, one or more of (1) the main control valve's open position, (2) the spillback control valve's open position, and (3) the specified flow rate of the pump. The best efficiency point may be defined by a flow rate at which the pump operates with a least amount of wear and/or least likelihood to exhibit a pump event (e.g., cavitation).

In another embodiment, the method may include transporting one or more additional fluids from one or more additional tanks to the mixing pipe. The method may include admixing, in the mixing pipe, (1) the first portion of the fluid flowing from the main control valve and (2) the one or more additional fluids from the one or more additional tanks. The method may include measuring, via a mixing flow meter position along the mixing pipe, a blend flow rate of the blend of (1) the first portion of the fluid flowing from the main control valve and (2) the one or more additional fluids from the one or more additional tanks. The method may include, in response to a ratio of (1) the blend flow rate and (2) the flow rate of the first portion of the fluid flowing from the main control valve being different than a pre-set blend ratio, adjusting, based on the difference between (1) the ratio of the blend flow rate and the flow rate of the first portion of the fluid flowing from the main control valve and (2) the blend ratio, one or more of (1) the specified flow rate of the pump, (2) the main control valve's open position, and (3) the spillback control valve's open position.

Another embodiment of the disclosure is directed to an in-line fluid mixing system positioned at a tank farm to admix hydrocarbon liquids from a plurality of tanks into a single pipeline. The in-line fluid mixing system may include a first tank positioned at a tank farm containing a first fluid therein. The in-line fluid mixing system may include a first tank pipe connected to the first tank and to transport the first fluid from the first tank. The in-line fluid mixing system may include a pump. The pump may include an input and an output. The input of the pump may be connected to the first tank pipe. The pump may control flow rate of the first fluid from the first tank pipe. The in-line fluid mixing system may include a first pipe connected to the output of the pump. The in-line fluid mixing system may include a main control valve connected to the first pipe and to further control flow rate of the first fluid from the pump. The in-line fluid mixing system may include a mixing pipe connected to the main control valve. The in-line fluid mixing system may include a spillback loop connected to the first pipe and the first tank pipe. The spillback loop may include a spillback control valve and the spillback control valve may further control flow rate of the first fluid by diverting a portion of the first fluid from the first pipe to the first tank pipe. The diverted portion or amount of the first fluid may be based on (1) a best efficiency point of the pump defined by a flow rate at which the pump operates with a least amount of wear and (2) a current pump efficiency point of the pump defined by the best efficiency point and pump speed. The in-line fluid mixing system may include a second tank positioned at the tank farm containing a second fluid therein. The in-line fluid mixing system may include a second tank pipe connected to the second tank and the mixing pipe. The second tank pipe may transport the second fluid to the mixing pipe. The second fluid and remaining portion of the first fluid may mix in the mixing pipe thereby forming a mixture.

Another embodiment of the disclosure is directed to a pump efficiency point operation system positioned at a tank farm to drive a pump to operate at an efficiency point. The system may include a tank positioned at a tank farm containing a fluid therein. The system may include a tank pipe connected to the tank and to transport the fluid from the tank. The system may include a pump including an input and an output. The input of the pump may be connected to the tank pipe. The pump may control flow rate of the first fluid from the tank pipe. The system may include a pipe connected to the output of the pump. The system may include a main control valve connected to the pipe and to further control flow rate of the first fluid from the pump to a mixing pipe. The system may include a spillback loop connected to the pipe and the tank pipe, the spillback loop including a spillback control valve, the spillback control valve to further control flow rate of the fluid by diverting a portion of the fluid from the pipe to the tank pipe, the diverted portion of the fluid based on a best efficiency point and a current pump efficiency point and speed of the pump.

Another embodiment of the disclosure is directed to a controller for controlling pump efficiency point operation in an in-line mixing system for admixing fluid from two or more tanks into a single pipeline. The controller may include a user interface input/output in signal communication with a user interface such that the controller is configured to receive a target blend ratio of a first fluid of a first tank to a second fluid of a second tank. The controller may include a first input/output in signal communication with a pump. The pump may be connected to a first pipe. The first pipe may be connected to the first tank. The pump may control a flow rate of the first fluid from the first pipe to a second pipe. The controller may be configured, in relation to the first input/output, to transmit a signal to the pump to cause the pump to adjust the flow rate of the first fluid. The controller may include a first input in signal communication with a spillback meter to measure an amount of the first fluid diverted from the second pipe to a spillback loop. The controller may include a second input in signal communication with a main meter to measure an amount of the first fluid flowing through a main control valve. The controller may include a second input/output in signal communication with a spillback control valve. The spillback control valve may be positioned along a spillback loop. The spillback control valve may be connected to the second pipe and the first pipe. The spillback control valve may control an amount of the first fluid to be diverted from the second pipe back to the first pipe. The controller may be configured, in relation to the second input/output to (1) determine a corrected ratio, based on measurements from the first input and the second input, and (2) transmit a signal to one or more of the spillback control valve or the main control valve to cause the one or more of the spillback control valve or the main control valve to adjust to a position indicated by the corrected ratio.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the scope of the disclosure.

DETAILED DESCRIPTION

Figure 1A:
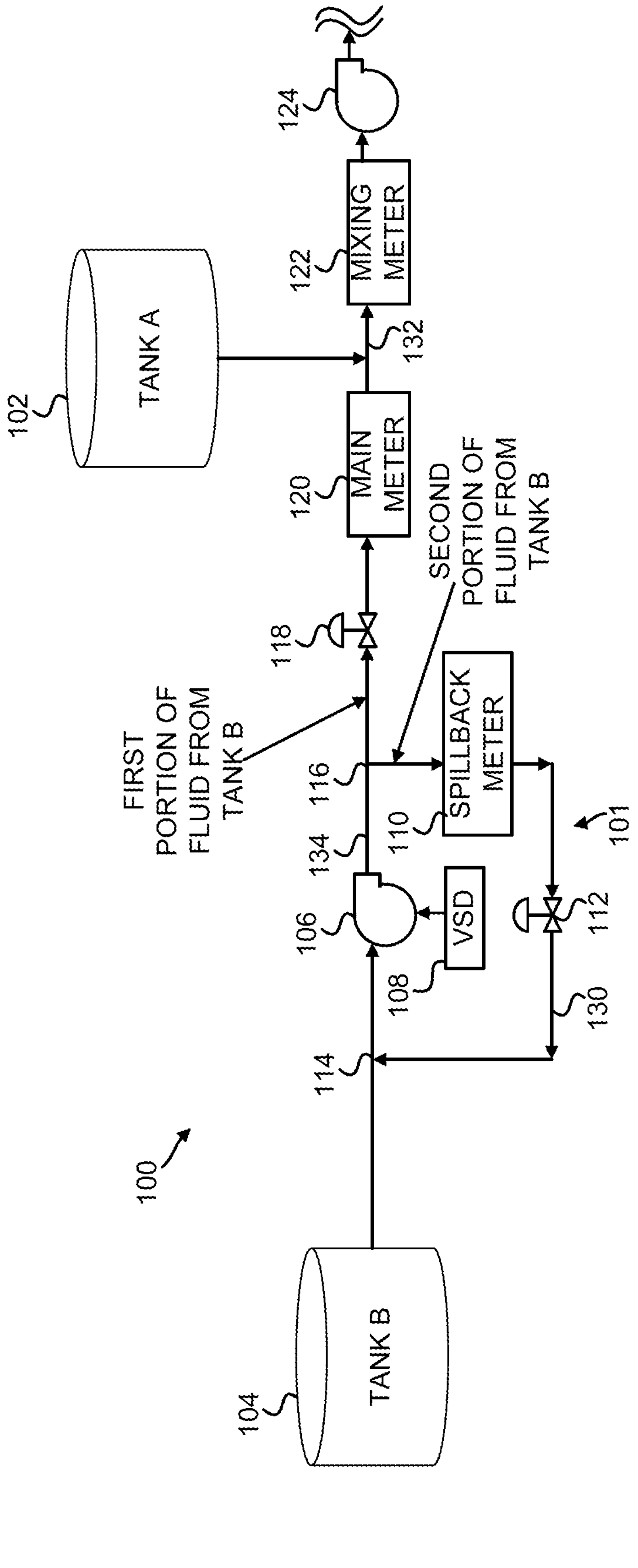
FIG. 1A, FIG. 1B, FIG. 1C, and FIG. 1D are schematic block diagrams of respective in-line mixing systems positioned at a tank farm and configured to operate a pump at an efficiency point, according to an embodiment of the disclosure.
Figure 1B:
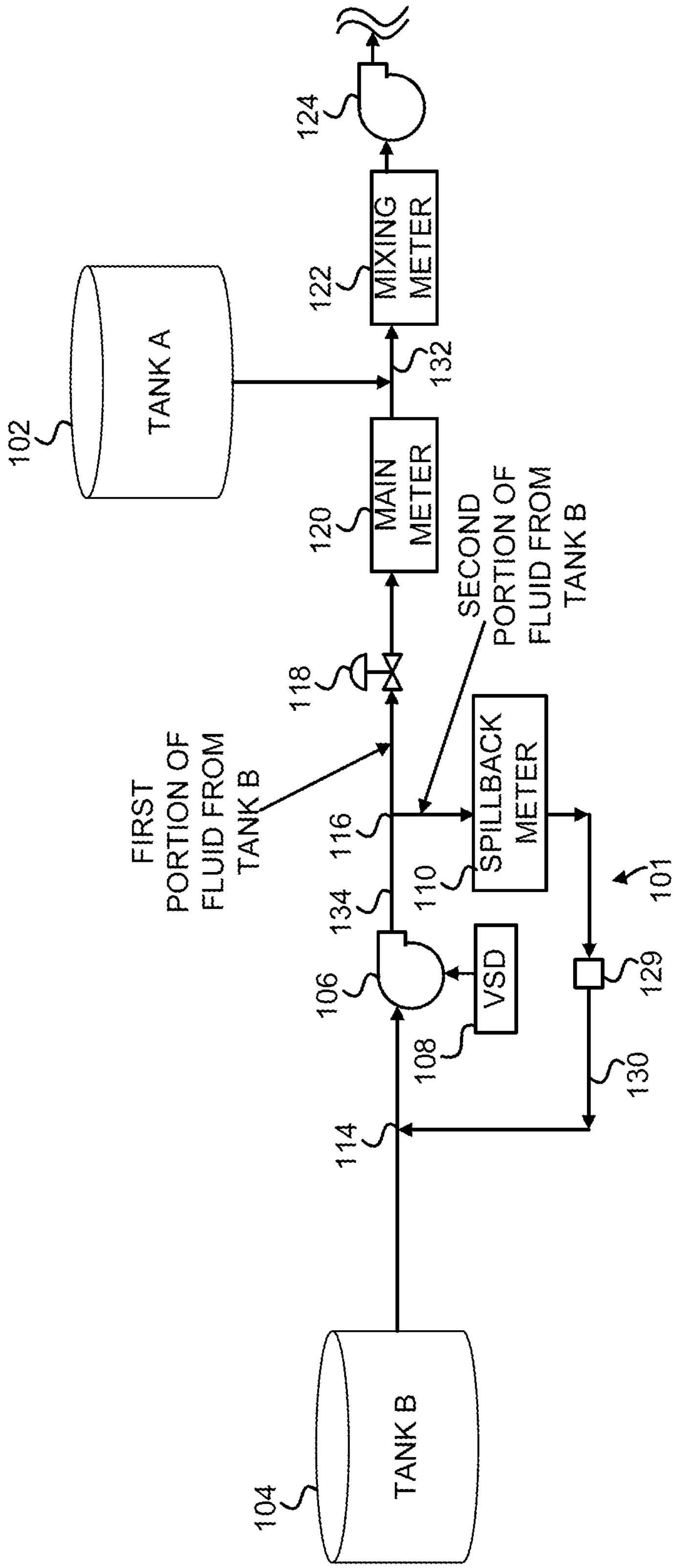

So that the manner in which the features and advantages of the embodiments of the systems and methods disclosed herein, as well as others that will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the systems and methods disclosed herein and are therefore not to be considered limiting of the scope of the systems and methods disclosed herein as it may include other effective embodiments as well.

The present disclosure provides embodiments of systems and methods for in-line fluid mixing of hydrocarbon liquids. “Hydrocarbon liquids” as used herein, may refer to petroleum liquids, renewable liquids, and other hydrocarbon based liquids. “Petroleum liquids” as used herein, may refer to liquid products containing crude oil, petroleum products, and/or distillates or refinery intermediates. For example, crude oil contains a combination of hydrocarbons having different boiling points that exists as a viscous liquid in underground geological formations and at the surface. Petroleum products, for example, may be produced by processing crude oil and other liquids at petroleum refineries, by extracting liquid hydrocarbons at natural gas processing plants, and by producing finished petroleum products at industrial facilities. Refinery intermediates, for example, may refer to any refinery hydrocarbon that is not crude oil or a finished petroleum product (e.g., such as gasoline), including all refinery output from distillation (e.g., distillates or distillation fractions) or from other conversion units. In some non-limiting embodiments of systems and methods, petroleum liquids may include heavy blend crude oil used at a pipeline origination station. Heavy blend crude oil is typically characterized as having an American Petroleum Institute (API) gravity of about 30 degrees or below. However, in other embodiments, the petroleum liquids may include lighter blend crude oils, for example, having an API gravity of greater than 30 degrees. “Renewable liquids” as used herein, may refer to liquid products containing plant and/or animal derived feedstock. Further, the renewable liquids may be hydrocarbon based. For example, a renewable liquid may be a pyrolysis oil, oleaginous feedstock, biomass derived feedstock, or other liquids, as will be understood by those skilled in the art. The API gravity of renewable liquids may vary depending on the type of renewable liquid.

In some embodiments, the systems and methods as described herein may provide for in-line, on-demand, blending of crude oil, other hydrocarbon liquids, and/or renewable liquids at a pipeline origination station. A pipeline origination station is typically located at or near a tank farm (e.g., having a plurality of tanks containing hydrocarbon liquids). The pipeline origination station includes extensive piping capable of transporting the hydrocarbon liquids from each of the nearby tanks in the tank farm to one or more mainline booster pumps, which raise the hydrocarbon liquids to very high pressures for passage through the long pipeline. A “tank farm” as used herein, refers to a plurality of tanks positioned in an area, each of the plurality of tanks configured to hold one or more hydrocarbon liquids therein. In some embodiments, the plurality of tanks may be positioned proximate to each other or the plurality of tanks may be spread out across a larger area. In some embodiments, the plurality of tanks may be positioned sequentially such that each tank is equally spaced apart. Generally, the number of individual tanks in a tank farm may vary based on the size of the pipeline origination station and/or based on the amount of hydrocarbon liquids being stored in that facility. For example, the tank farm may include at least 2, at least 4, at least 6, at least 8, at least 10, at least 12, or more individual tanks within the tank farm.

As noted above, typical pipeline origination stations require blending of two or more different hydrocarbon liquids in a blending tank prior to pumping the blended hydrocarbon liquids from the blending tank itself. However, the systems and methods of this disclosure advantageously provide in-line, on-demand mixing directly in a pipe in the tank farm prior to the blended liquid being pumped to the pipeline. Such pipe blending may eliminate stratification of mixed oil in tanks and does not require the use of individual tank mixers in each of the tanks. These systems and methods may also eliminate the need to mix the hydrocarbon liquids in one or more tanks before the hydrocarbon liquids are pumped therefrom, which advantageously allows for the changing of the blend on-demand and on-demand blending during operation of the pipeline origination station. In some embodiments, for example, a separate blending tank in the tank farm is not necessary, and thus, one or more tanks in the tank farm previously used for blending may beneficially be used for storage of additional hydrocarbon liquids, which may also be blended in-line.

Other typical pipeline origination stations may use parallel mixing of two or more hydrocarbon liquids, which may be expensive and of lower efficiency. In particular, typical parallel mixing operations require a dedicated high horsepower mixing booster pump (e.g., greater than 750 hp, greater than 850 hp, greater than 950 hp or even greater than 1050 hp) for each of the mixing streams and an additional static mixer to blend the hydrocarbon liquids pumped through each of the mixing streams. However, the systems and methods of this disclosure advantageously provide cost and energy savings, because such systems and methods do not require high horsepower mixing booster pumps or the additional static mixer. For example, the mixing booster pumps typically used in the mixing streams of the systems and methods described herein typically have lower horsepower ratings (e.g., less than 250 hp, less than 200 hp, less than 150 hp, or even less than 100 hp). In addition, the in-line mixing systems, according to this disclosure, may eliminate the need for two or more variable speed pumps and/or control valves (i.e., one for each of the streams), because as further disclosed herein, one stream may be gravity-fed from the tank and thus controls itself in physical response to the other controlled, tank output stream(s). Further, in-line mixing systems as described herein may provide for more accurate control of blended hydrocarbon liquids, for example, within 1.0 percent or less of the desired set point (e.g., desired flow rate and/or density or gravity) for the blended fluid flow.

In further embodiments, the disclosure provides systems and methods to operate a pump at an efficiency point during an in-line blending operation. Such systems and methods may include two or more tanks at a tank farm. Each of the tanks may connect to a mixing pipe or header where the fluid stored in each of the tanks may be admixed during a blend or blending operation. In such embodiments, two or more tanks may be utilized in a blend or blending operation. Further, and for example, during a two blend operation, fluid may flow from one tank to the mixing pipe via gravity, while another fluid may flow from another tank to the mixing pipe via a pump. Pumps typically include a particular curve or a pump curve. Such a curve indicates how a pump may perform in relation to pump head and flow. The pump head may be the height of fluid that is delivered at a given flow rate. A pump curve may further indicate a pump’s best efficiency point (BEP). The best efficiency point may be the point at which a pump operates at a peak efficiency. At BEP, a pump may operate with the least amount of energy consumption and/or with the highest reliability (e.g., less likely to exhibit issues, such as cavitation, recirculation damage, damage caused by a pressure above a pre-selected threshold, and/or damage caused by a pressure below a pre-selected threshold, etc.). The systems and methods described herein may provide for operating a pump at the BEP or at a pre-selected percentage within BEP to increase pump life, decrease energy consumption, decrease events caused by reliability issues, and/or ensure efficient blending operations.

Typical in-line mixing systems do not include spillback loops to control a pump’s efficiency point during blending operations. In the systems and methods described herein, the tank with a corresponding pump may include a spillback loop surrounding or substantially surrounding the pump. In such examples, a pipe may connect an inlet of a spillback loop to a point proximate to or nearby the outlet of the pump. As fluid flows from the outlet of the pump, a portion of the fluid may flow through the inlet of the spillback loop (e.g., fluid may flow into the spillback loop). The spillback loop may further include a spillback control valve and/or other spillback flow control device. The spillback control valve and/or other spillback flow control device may control the amount of fluid flowing through the spillback loop, thus controlling the pump’s efficiency point during a blending operation. Further, a tank may connect to, via a pipe, an inlet of the pump. The spillback loop may connect to a point proximate to or nearby the inlet of the pump. As such, the fluid flowing through the spillback loop may flow back through the inlet of the pump (e.g., the fluid may recirculate through the pump).

In some embodiments, the amount of fluid flowing through the spillback loop may be controlled via adjustment of one or more pump speed, a main control valve position, and the spillback control valve position. When one the devices or components are adjusted, the mix ratio may change. As such, the systems and methods described herein include a controller to adjust such devices or components based on a mix or blend ratio first, followed by adjustment for a pump's efficiency point. Each of the adjustments noted may occur periodically at the same or at different intervals. In an embodiment, the intervals may be different for each device or component to ensure that each device or component does not compete with one another. In other words, one component (e.g., the main control valve) being adjusted, followed by immediate or substantially adjustment of another component (e.g., the spillback control valve) substantially in perpetuity or continuously. In such an example, equilibrium of pump efficiency and/or of a mix or blend ratio may not occur at any point, rather, adjustments may continue to occur for the duration of the mixing or blending operation.

Some aspects of the disclosure relate to methods of admixing hydrocarbon liquids (such as those described herein above) from a plurality of tanks into a single pipeline, e.g., using one or more system embodiments herein, to provide in-line mixing thereof. As noted herein above, the systems and methods described are intended to be suitable for providing mixing of two or more hydrocarbon liquids in-line, e.g., to provide two-component blended flows, three-component blended flows, or blended flows having more than three components.

FIG. 1A, FIG. 1B, FIG. 1C, and FIG. 1D are schematic diagrams of an in-line mixing system positioned at a tank farm and configured to operate a pump at an efficiency point, according to an embodiment of the disclosure. As depicted, an in-line mixing system 100 may include two or more tanks. Fluid may flow from at least one tank (e.g., tank A 102), via gravity, during a blending or mixing operation to a mixing pipe 132. The fluid flow rate from tank A 102 may change over the course of the blending or mixing operation. For example, over the course of a blending or mixing operation, the fluid level within tank A 102 may decrease. At lower levels, the fluid flow rate from tank A 102 may begin to decrease. Further, varying viscosities, refilling tank A 102, temperature changes, buildup, and/or other changes may alter the flow rate.

Fluid may flow from at least one other tank (e.g., tank B 104), via a pump 106, during a blending or mixing operation to the mixing pipe 132. In such embodiments, a spillback loop 101 may be positioned about or may surround or substantially surround the pump 106. The spillback loop 101 may be configured to drive the pump 106 to operate at or within a preselected percentage of the pump's 106 best efficiency point. The spillback loop 101 may include one or more various components. For example, the spillback loop 101 may include a spillback meter 110 and/or a spillback control valve 112. The spillback loop 101 may further comprise or include a spillback loop pipe 130. The spillback loop pipe 130 may comprise a spillback loop pipe 130 with an inlet to connect to the main pipe 134 at point 116 and an outlet to connect to the main pipe 134 at point 114. The spillback loop 101 may further include a spillback meter 110, to measure the flow rate or other characteristics (e.g., pressure, density, gravity, temperature, and/or other characteristic) of fluid flowing through the spillback loop 101, and a spillback control valve 112 to control, at least in part, the flow rate of fluid flowing into and through the spillback loop 101. In an embodiment, the flow control valve 112 may be a one-way control valve.

Figure 1C:
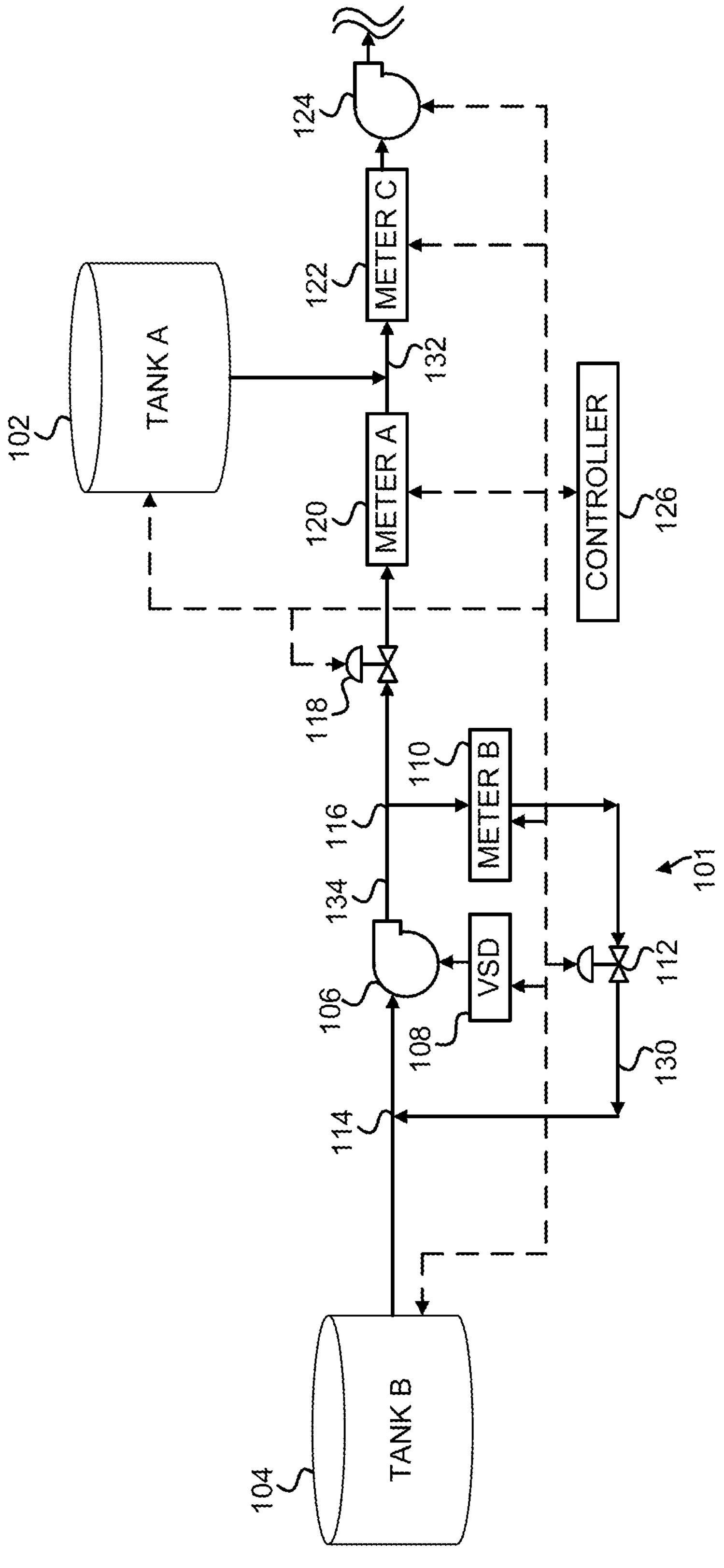
Figure 1D:
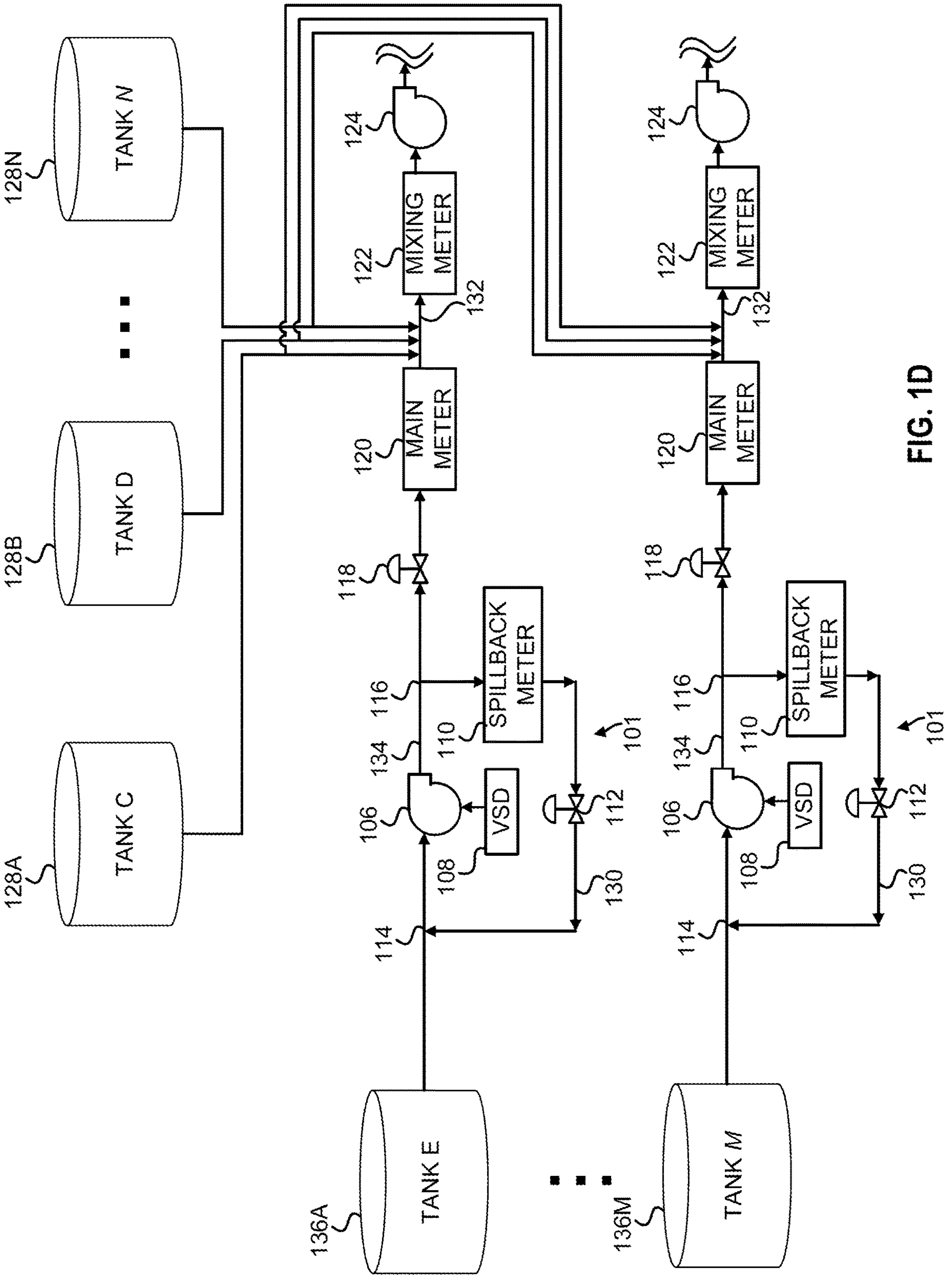

In another embodiment, rather than a spillback control valve 112, a spillback flow control device (e.g., flow control device 129 in FIG. 1B) may be utilized. The flow control device 129 may comprise, in addition to or rather than a flow control valve, a turbine or other device capable of controlling a fluid flow. In such embodiments, the turbine may control the flow rate through the spillback loop 101, while in turn generating electrical power. Such electrical power may be utilized to power devices or components of the in-line mixing system (e.g., the pump 106, the controller 126 as illustrated in FIG. 1C, the booster pump 124, any control valves or other flow control devices utilized throughout the in-line mixing system 100, and/or any other device or component utilizing electricity) or may be stored in on-site energy storage devices (e.g., batteries or capacitor based energy storage devices). Further, in such embodiments, the turbines may limit flow therethrough based on a gearbox corresponding to the turbine or based on a variable resistance rotor, or some combination thereof.

As fluid flows from the outlet of pump 106, a portion of the fluid may flow through the spillback loop 101. The amount of fluid flowing to the spillback loop 101 may be based on the position of the spillback control valve 112, the position of a main control valve 118, and/or the pump 106 speed. Pump 106 speed may be controlled by, for example, a variable speed drive (VSD) 108. A VSD 108 may include various drives to alternate pump speed, including, but not limited to, a variable frequency drive (e.g., adjusting frequency and voltage input to a motor or the pump to adjust speed), an eddy current drive, or any other electrical, mechanical, or electromechanical drive capable of adjusting the speed of a pump, as will be understood by a person skilled in the art.

As noted, the in-line mixing system 100 may include components or devices to manage a mix or blend ratio, such as the controller 126 depicted in FIG. 1C. In such embodiments, and as described in further detail in relation to FIGS. 2A-2B, the controller 126 may include instructions, that when executed, are configured to measure, obtain, or determine various characteristics of the in-line mixing system 100 and adjust various components or devices included throughout the in-line mixing system 100. For example, during a blending operation, the controller 126 may measure, obtain, or determine the current speed of the VSD 108, in other words, the speed of the pump 106, based on signals received via an input/output of the controller 126 connected to the VSD 108. Based on the current speed of the pump 106, the controller 126 may transmit a signal (e.g., from an input/output of the controller 126) to the spillback control valve 112, the main control valve 118, and/or the VSD 108 to adjust to a position or speed, respectively, to drive the pump to operate within a pre-selected percentage of the pump's BEP. Such a pre-selected range may include about 40% to about 120%, about 40% to about 110%, about 40% to about 100%, 60% to about 120%, about 60% to about 110%, about 60% to about 100%, 80% to about 120%, about 80% to about 110%, or about 80% to about 100% of the pump's BEP. Such a range may be pre-set or pre-selected within the controller, determined based on a particular blending or mixing operation (e.g., type of fluids to be mixed and/or length of time of the blending or mixing operation), and/or based on input via a user interface in signal communication with the controller 126. In such embodiments, operating a pump at or within a pre-selected percentage of a pump's BEP may cause the pump to operate with the least amount of energy consumption and/or with the highest reliability (e.g., less likely to exhibit issues, such as cavitation, recirculation damage, damage caused by a pressure above a pre-selected threshold, and/or damage caused by a pressure below a pre-selected threshold).

In an embodiment, the adjustment of the VSD 108 may alter or change the flow rate of fluid flowing through the main control valve 118, potentially changing the mix or blend ratio. In such examples, the controller 126 (e.g., as depicted in FIG. 1C) may adjust (e.g., via signals from an input/output of the controller 126) the main control valve 118 to maintain the mix or blend ratio. Further, the spillback control valve 112 may be adjusted (e.g., via signals from an input/output of the controller 126) to maintain the mix or blend ratio, while driving the pump 106 to operate within a pre-selected percentage of the pump's BEP. In another embodiment, the spillback control valve 112 may be adjusted to fine-tune the efficiency point of the pump and/or the flow rate through the main valve 118.

Further, the controller 126 may transmit a signal (e.g., via an input/output of the controller 126) to the spillback control valve 112, the main control valve 118, and/or the VSD 108 to adjust to a position or speed, respectively, to maintain or drive an actual blend or mix ratio to a desired blend or mix ratio. In an example, a characteristic of the fluid flowing through the main pipe 134, the spillback loop pipe 130, and/or the mixing pipe 132 may be utilized to determine the actual blend or mix ratio. In a further non-limiting example, the characteristics may include flow rate. A main meter 120 may be positioned downstream of the main control valve 118 and upstream of the point where fluid from tank A 102 blends with fluid from tank B 104. In an embodiment, the main meter 120 may be positioned proximate to the outlet of the main control valve 118. The main meter 120 may measure the flow rate of the fluid flowing through the main pipe 134. A spillback meter 110 may be positioned along the spillback loop 101 and may be positioned either upstream or downstream of the spillback control valve 112. The spillback meter 110 may measure the flow rate of the fluid flowing through the spillback loop pipe 130. A mixing meter 122 may measure a flow rate of the blend or mix flowing through the mixing pipe 132. Based one or more of the measurements of flow rate and/or any other characteristic (e.g., density, gravity, temperature, and/or other characteristics) of the fluids within any of the pipes of the in-line mixing system 100, the controller 126 may determine a corrected blend or mix ratio. Such a corrected blend or mix ratio may further be based on a comparison between the actual or current blend or mix ratio as compared to the desired blend or mix ratio.

Based on the corrected ratio, the controller 126 may transmit a signal (e.g., via an input/output of the controller 126) to the spillback control valve 112, the main control valve 118, and/or the VSD 108 to adjust to a position or speed, respectively. Such adjustments may occur periodically. Further, each device or component may adjust or may be adjusted at different times or different length time intervals. For example, the VSD 108 may be adjusted every about 1 second to about 2 seconds or longer. Next, the main control valve 118 may be adjusted every about 10 seconds or longer. Finally, the spillback control valve 112 may include, in a non-limiting example, the longest time interval, such as adjustment every about 30 seconds to about 90 seconds or longer. While ranges for each interval are listed it will be understood that more or less time may be utilized for each adjustment interval. Further, each adjustment may occur substantially simultaneously or consecutively, e.g., pump 106 speed may be adjusted, the main control valve 118 position may be adjusted, and then spillback control valve 112 position may be adjusted. In another example, the pump 106 speed may be adjusted every about 1 second to about 2 seconds, while the main control valve 118 position is adjusted every about 10 seconds and the spillback control valve 112 position is adjusted every 30 seconds to about 90 seconds. After a length or period of time, the blend or mix operation may reach an equilibrium where less adjustments may occur.

In another embodiment, the in-line mixing system 100 may include two or more gravity fed tanks (e.g., tank C 128A, tank B 128B, or up to tank N 128N) and may include two or more pump fed tanks (e.g., tank E 136A or up to tank M 136M). For any blending or mixing operation, two or more of the tanks may be utilized. In such embodiments, the controller 126 may measure, obtain, or determine the characteristics for each flow and adjust each flow throughout the blend or mixing operation accordingly.

Figure 2A:
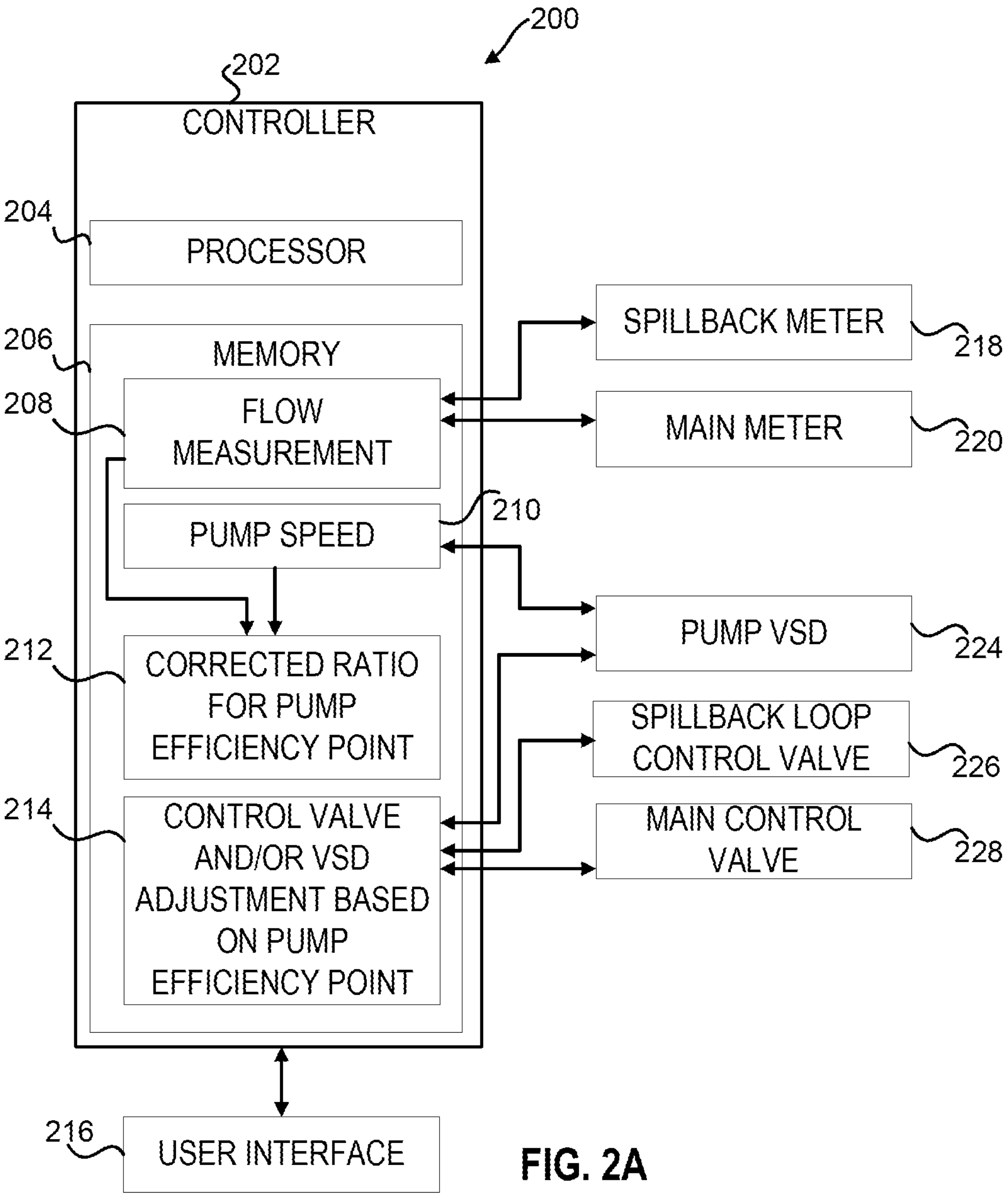
FIG. 2A and FIG. 2B are simplified block diagrams illustrating control systems for operating a pump at an efficiency point, according to embodiments of the disclosure.
Figure 2B:
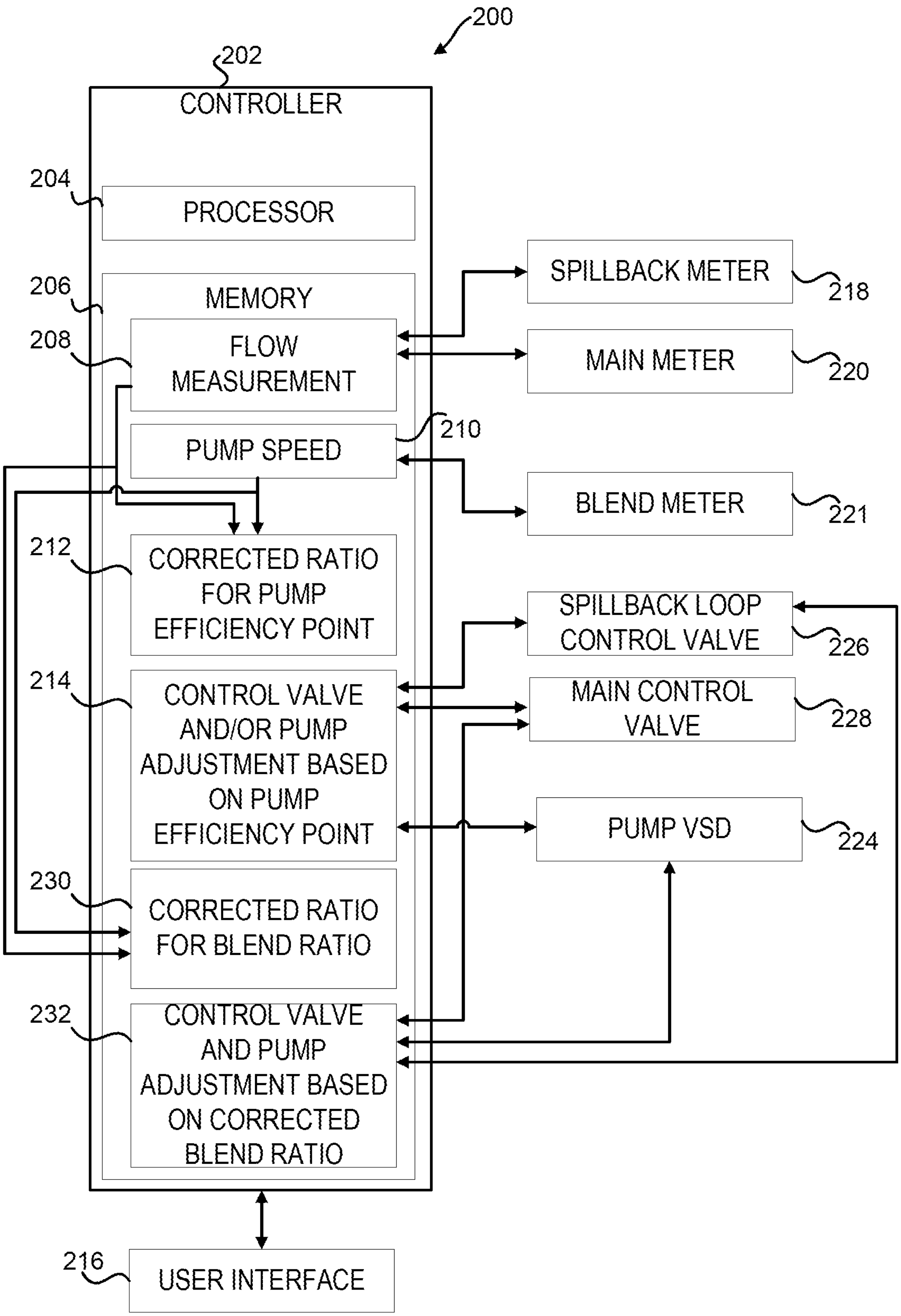

FIG. 2A and FIG. 2B are simplified diagrams illustrating control systems for managing a multi-component in-line mixing system, according to an embodiment of the disclosure. The control system, as described herein, may be a controller 202, one or more controllers, a PLC, a SCADA system, a computing device (e.g., laptop, desktop, server, tablet, smartphone, and/or any other computing device), and/or other components to manage a blending operation. The controller 202 may include one or more processors (e.g., processor 204) to execute instructions stored in memory 206. In an example, the memory 206 may be a machine-readable storage medium. As used herein, a "machine-readable storage medium" may be any electronic, magnetic, optical, or other physical storage apparatus to contain or store information such as executable instructions, data, and the like. For example, any machine-readable storage medium described herein may be any of random access memory (RAM), volatile memory, non-volatile memory, flash memory, a storage drive (e.g., hard drive), a solid state drive, any type of storage disc, and the like, or a combination thereof. As noted, the memory 206 may store or include instructions executable by the processor 204. As used herein, a "processor" may include, for example one processor or multiple processors included in a single device or distributed across multiple computing devices. The processor 204 may be at least one of a central processing unit (CPU), a semiconductor-based microprocessor, a graphics processing unit (GPU), a field-programmable gate array (FPGA) to retrieve and execute instructions, a real time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, forms of near field communications, or other wireless communication methods as will be understood by those skilled in the art. In addition, signal communication may include one or more intermediate controllers, relays, or switches disposed between elements that are in signal communication with one another.

As noted, the memory 206 may store instructions executable by the processor 204. The instructions may include instructions 208. Instructions 208 may include flow measurement instructions to measure, obtain, or determine the flow of fluid at various points or locations within the mixing pipes, spillback loop pipe, and/or other locations within the in-line mixing system (e.g., in-line mixing system 100). In an embodiment, the controller 202 may determine, obtain, or measure the flow from one or more of a spillback meter 218 and/or a main meter 220. In another embodiment, the controller 202 may measure, obtain, or determine other characteristics of the different fluids flowing within the in-line mixing system. In such examples, different sensors and/or meters may be positioned throughout the in-line mixing system and may be connected and/or in signal communication with the controller 202 via one or more inputs/outputs of the controller 202. The meters and/or sensors positioned throughout the in-line mixing system may be hydrometers, gravitometers, densitometers, density measuring sensors, gravity measuring sensors, pressure transducers, flow meters, mass flow meters, Coriolis meters, viscometer, optical level switches, ultrasonic sensors, capacitance based sensors, other measurement sensors to determine a density, gravity, flow, tank level, or other variable as will be understood by those skilled in the art, or some combination thereof. In such examples, the meters and/or sensors may measure the density and/or gravity of a liquid, the flow of the liquid, the pressure of the liquid, the viscosity of the liquid, and/or a tank level. As noted above, the controller 202 may be in signal communication with the sensors or meters. The controller 202 may poll or request data from the meters and/or sensors at various points and/or at different time intervals in a blending operation. The meter and/or sensor may be in fluid communication with a liquid to measure the density, gravity, or flow rate or may indirectly measure density, gravity, or flow rate (e.g., an ultrasonic sensor). In other words, the sensor or meter may be a clamp-on device to measure flow and/or density indirectly (such as via ultrasound passed through the pipe to the liquid).

The memory 206 may include instructions 210 to cause the controller 202 to measure, obtain, or determine a current pump speed. In such embodiments, the controller 202 may be in signal communication with a pump VSD 224 (e.g., via an input/output of the controller 202). The pump VSD 224 may adjust and/or set the speed at which the pump operates. In another embodiment, the instructions 210 may, in addition to measuring the current speed of a pump, cause the controller 202 to adjust the pump speed or set a new pump speed via signals transmitted to the pump VSD 224.

The memory 206 may include instructions 212 to cause the controller 202 to determine a corrected ratio to drive a pump to operate within a pre-selected percentage of the pump's BEP. In such examples, whether adjustments are to be performed are based on the current pump speed multiplied by the pump's BEP (e.g., the pump's current efficiency point). In another embodiment, the adjustments may be further based on other measurements or values (e.g., the measurements taken or values determined or obtained in relation to instructions 208). Such a corrected ratio or adjustments may include positions that a spillback control valve 226 and/or main control valve 228 may adjust to. Further, the corrected ratio or adjustments may include a speed to set or adjust the pump VSD 224 to. The correct ratio or adjustments may be determined at regular time intervals. In another embodiment, the corrected ratio or adjustments may be determined at different time intervals for each component or device (e.g., shorter time intervals for the pump VSD 224 and longer time intervals for the spillback control loop 226 and the main control valve 228). The instructions 230, when executed, may determine a corrected ratio for a blend ratio.

The memory 206 may include instructions 214 to cause the controller 202 to adjust the spillback control valve 226, the main control valve 228, and/or the pump VSD 224 based on the values indicated or determined by instructions 212.

The memory 206 may include instructions 230 to cause the controller 202 to determine a corrected ratio (e.g., an amount of fluid from the main control valve 228 in relation to fluid from a gravity based flow from a tank) for a pre-selected or desired blend or mix ratio. The controller 202 may base the position and speed of the spillback control valve 226, the main control valve 228, and/or the pump VSD 224 on the pre-selected or desired blend or mix ratio. In such examples, the controller may determine the current ratio based on the characteristics measured, obtained, or determined by instructions 208, instructions 210, and/or some other instructions measuring other characteristics of the fluid in the in-line mixing system. For example, the controller 202 may determine the corrected ratio based on the blend or mix flow (e.g., as measured or obtained by the blend meter 221) and/or the flow from the main control valve 228 (e.g., as measured or obtained by the main meter 220). In such examples, the measurements or obtained values may be utilized to determine the flow rate of the gravity fed stream. Using the flow rate of the gravity fed stream, a corrected amount or ratio of the flow from the main control valve 228 may be determined. Based on such a corrected amount or ratio, the controller 202 may determine an adjusted position of the spillback control valve 226 and/or the main control valve 228 and/or an adjusted speed of the pump VSD 224.

The memory 206 may include instructions 232 to cause the controller 202 to adjust the spillback control valve 226, the main control valve 228, and/or the pump VSD 224 based on the values indicated or determined by instructions 230.

Figure 3:
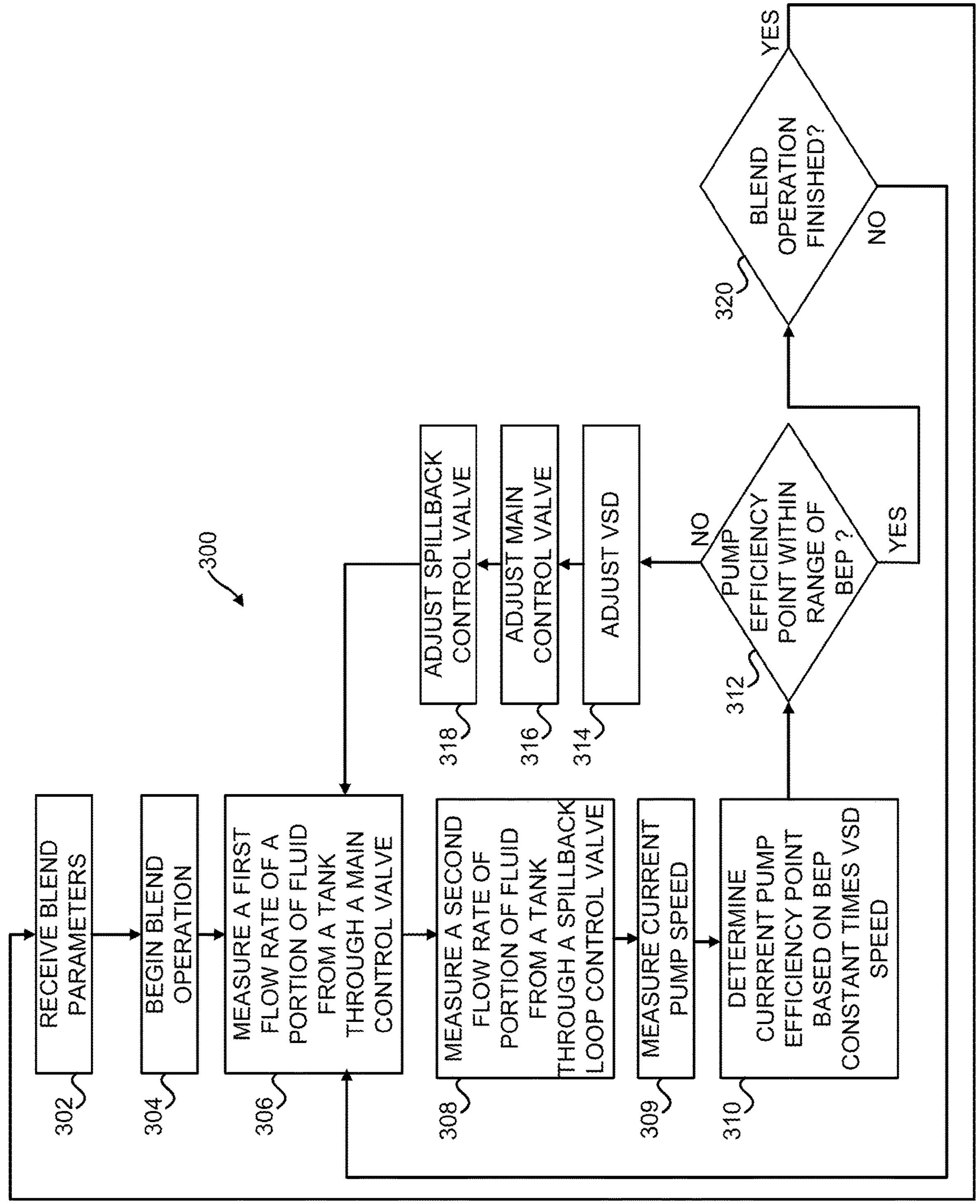
FIG. 3 is a flow diagram of a method for operating a pump at an efficiency point, according to an embodiment of the disclosure.

FIG. 3 is a flow diagram, such as implemented in a controller, of a method for managing a multi-component in-line mixing system according to an embodiment of the disclosure. according to an embodiment of the disclosure. The method 300 is detailed with reference to the controller 202 and in-line mixing system 200 of FIG. 2. Unless otherwise specified, the actions of method 300 may be completed within the controller 202, for example, but it also may be implemented in other systems and/or computing devices as will be understood by those skilled in the art. Specifically, method 300 may be included in one or more programs, protocols, or instructions loaded into the memory 206 of the controller 202 and executed on the processor 204 or one or more processors of the controller 202. The order in which the operations are described is not intended to be construed as a limitation, and any number of the described blocks may be combined in any order and/or in parallel to implement the methods.

At block 302, the controller 202 may receive blend parameters. The controller 202 may receive the blend parameters, for example, from a user interface 216 or from a received blend specification or document. The blend parameters may include data such as type and amount of fluids to be blended or mixed, length of the blend operation, a pre-selected or desired blend ratio, and/or other data related to a blend operation. In another embodiment, prior to or during reception of the blend parameters, the controller 202 may receive a BEP for a pump to be utilized in the blend operation. The BEP may be a constant for the pump. In an embodiment, the BEP may change over time and, thus, may be updated periodically. Pump events, such as wear, maintenance, repair, cavitation, prolonged use, and/or other negative events may affect or alter the BEP of a pump. As such, the controller 202 may determine an updated BEP or receive an updated BEP periodically, in between blend operations, during a blend operation, or at selected times.

At block 304, the controller 202 may begin or initiate the blend operation. As the blend operation is initiated, fluid may begin to flow from two or more selected tanks. At least one of the tanks may provide a gravity fed stream of a fluid, while at least another tank may provide a fluid via a pump and corresponding spillback loop and main control valve 228.

At block 306, the controller 202 may measure a first flow rate of a fluid flowing from the main control valve. At block 308, the controller 202 may measure a second flow rate of a fluid flowing through the spillback loop. At block 309, the controller 202 may measure the current pump speed of the pump utilized in the blend operation. If one or more pumps are utilized, then the controller 202 may measure the speed of each pump utilized, as well as flow rates for each. In another embodiment, additional details or characteristics of fluids in the blending operation may be measured, such as density, gravity, pressure, etc. At block 310, the controller 202 may determine the current pump efficiency point, based on the pump's BEP multiplied by the pump's current speed.

At block 312, the controller 202 may determine whether the pump efficiency point is within a pre-selected percentage of the BEP (e.g., about 40% to about 120%). At block 314, if the pump efficiency point is not within the pre-selected percentage of the BEP, the controller 202 may adjust the pump speed. The controller 202 may adjust the pump speed every about 1 to about 2 seconds or at other selected times. At block 316, the controller 202 may adjust the main control valve 228. The main control valve 228 may be adjusted in conjunction with the pump speed, as well as the spillback control valve 226, yet at a different interval, such as about every ten seconds. Further, the main control valve 226 may be adjusted to maintain the first flow rate measured. Finally, at block 318, the controller 202 may adjust the spillback control valve 226, also in conjunction with pump speed and the main control valve 228. In such examples, the adjustments may occur until the pump efficiency point is within the pre-selected range or percentage of BEP. Upon completion of the adjustment, the controller 202 may take measurements again and perform similar adjustments.

At block 320, if the pump efficiency point is within pre-selected range or percentage of BEP, then the controller 202 may determine whether the blend operation is finished (e.g., based on time or amount of fluid blended). If the blend operation is not finished, the controller 202 may continue to perform measurements and corresponding adjustments. If the blend operation is finished, the controller 202 may wait until another set of blend parameters is received.

In an embodiment, the controller 202 may monitor one or more blend operations simultaneously. In other words, two or more blend operations may occur at the same, the substantially same, or over-lapping time intervals Each of the two or more blend operations may include different sets of tanks and corresponding equipment, devices, and/or components.

Figure 4:
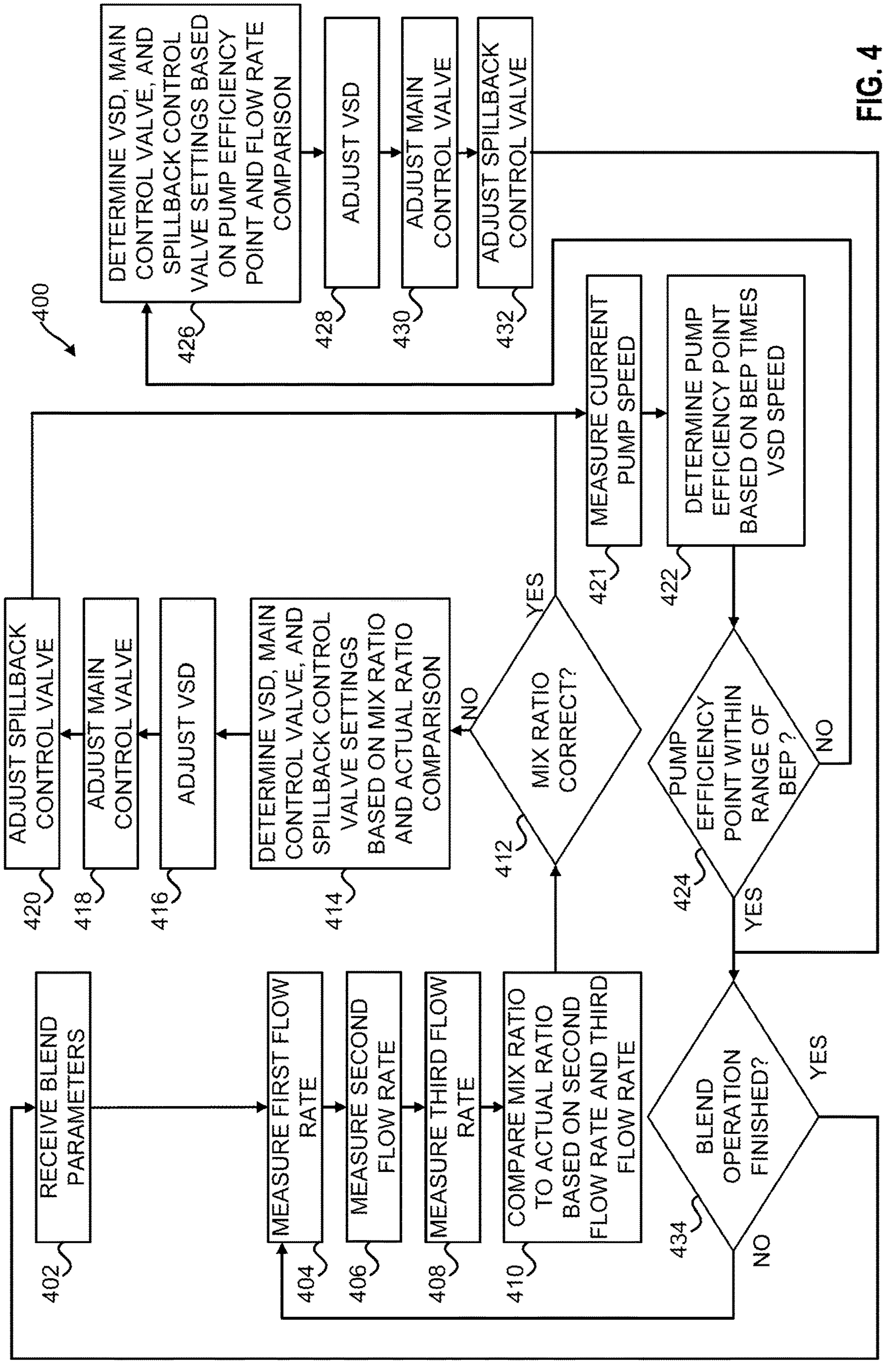
FIG. 4 is another flow diagram of a method for operating a pump at an efficiency point, according to an embodiment of the disclosure.

FIG. 4 is a flow diagram, such as implemented in a controller, of a method for managing a multi-component in-line mixing system according to an embodiment of the disclosure. according to an embodiment of the disclosure. The method 400 is detailed with reference to the controller 202 and in-line mixing system 200 of FIG. 2. Unless otherwise specified, the actions of method 400 may be completed within the controller 202, for example, but it also may be implemented in other systems and/or computing devices as will be understood by those skilled in the art. Specifically, method 400 may be included in one or more programs, protocols, or instructions loaded into the memory 206 of the controller 202 and executed on the processor 204 or one or more processors of the controller 202. The order in which the operations are described is not intended to be construed as a limitation, and any number of the described blocks may be combined in any order and/or in parallel to implement the methods.

At block 402, the controller 202 may receive blend parameters. The controller 202 may receive the blend parameters, for example, from a user interface 216 or from a received blend specification or document. The blend parameters may include data such as type and amount of fluids to be blended or mixed, length of the blend operation, a pre-selected or desired blend ratio, and/or other data related to a blend operation. In another embodiment, prior to or during reception of the blend parameters, the controller 202 may receive a BEP for a pump to be utilized in the blend operation. The BEP may be a constant for the pump. In an embodiment, the BEP may change over time and, thus, may be updated periodically. Pump events, such as wear, maintenance, repair, cavitation, prolonged use, and/or other negative events may affect or alter the BEP of a pump. As such, the controller 202 may determine an updated BEP or receive an updated BEP periodically.

At block 404, the controller 202 may measure (e.g., via a sensor) a first flow rate of a fluid flowing from the main control valve. At block 406, the controller 202 may measure (e.g., via a sensor) a second flow rate of a fluid flowing through the spillback loop. At block 408, the controller 202 may measure (e.g., via a sensor) a third flow rate of a blended fluid flowing through a mixing pipe. In another embodiment, additional details or characteristics of fluids in the blending operation may be measured (e.g., via sensors), such as density, gravity, pressure, etc.

At block 410, the controller 202 may compare a current mix ratio based on, at least, the second and third flow rate to a pre-selected or desired mix ratio. At block 412, the controller 202 may determine if the current mix ratio does not match the pre-selected or desired mix ratio. At block 414, if the current mix ratio does not match the pre-selected or desired mix ratio, the controller 202 may determine the current positions of each of the control valves in the in-line mixing system 200, as well as the current pump speed. At block 416, the controller 202 may adjust the pump speed every about 1 to about 2 seconds. At block 418, the controller 202 may adjust the main control valve 228. The main control valve 228 may be adjusted in conjunction with the pump speed, as well as the spillback control valve 226, yet at a different interval, such as about every ten seconds. Finally, at block 420, the controller 202 may adjust the spillback control valve 226, also in conjunction with pump speed and the main control valve 228. In such examples, the adjustments may occur until the mix ratio matches the pre-selected or desired mix ratio. During, between, and/or after such adjustments, the mix ratio may be determined and further adjustment may occur. Further, during, between, and/or after each adjustment, new flow rates and/or other characteristics may be measured or obtained and the settings for each device or component further adjusted.

At block 421, if the mix ratio is correct or if the adjustments described above have occurred, then the controller 202 may determine or measure the current pump speed. At block 422, the controller 202 may determine whether the pump efficiency point is within a pre-selected percentage of the BEP (e.g., about 40% to about 120%). At block 424, if the pump efficiency point is not within the pre-selected percentage of the BEP, the controller 202 may adjust the pump speed. At block 426, the controller 202 may determine the current positions of each of the control valves in the in-line mixing system 200, as well as the current pump speed. At block 428, the controller 202 may adjust the pump speed every about 1 to about 2 seconds. At block 430, the controller 202 may adjust the main control valve 228. At block 430, the main control valve 228 may be adjusted in conjunction with the pump speed, as well as the spillback control valve 226, yet at a different interval, such as about every ten seconds. Further, the main control valve 226 may be adjusted to maintain the first flow rate measured. Finally, at block 432, the controller 202 may adjust the spillback control valve 226, also in conjunction with pump speed and the main control valve 228. In such examples, the adjustments may occur until the pump efficiency point is within the pre-selected range or percentage of BEP. Upon completion of the adjustment, the controller 202 may take measurements or obtain such values again and perform similar adjustments.

At block 434, if the pump efficiency point is within pre-selected range or percentage of BEP or after the adjustments described above are performed, then the controller 202 may determine whether the blend operation is finished (e.g., based on time or amount of fluid blended). If the blend operation is not finished, the controller 202 may continue to perform measurements and corresponding adjustments. If the blend operation is finished, the controller 202 may wait until another set of blend parameters is received.

This application is a continuation of U.S. Non-Provisional application Ser. No. 17/894,537, filed Aug. 24, 2022, titled "METHODS AND SYSTEMS FOR OPERATING A PUMP AT AN EFFICIENCY POINT", which is a divisional of U.S. Non-Provisional application Ser. No. 17/856,529, filed Jul. 1, 2022, titled "METHODS AND SYSTEMS FOR OPERATING A PUMP AT AN EFFICIENCY POINT", which claims priority to and the benefit of U.S. Application No. 63/265,425, filed Dec. 15, 2021, titled "METHODS AND SYSTEMS FOR OPERATING A PUMP AT AN EFFICIENCY POINT", and U.S. Application No. 63/265,458, filed Dec. 15, 2021, titled "METHODS AND SYSTEMS FOR IN-LINE MIXING OF HYDROCARBON LIQUIDS", the disclosures of which are incorporated herein by reference in their entireties. U.S. Non-Provisional application Ser. No. 17/856,529 is also a Continuation-in-Part of U.S. application Ser. No. 17/566,768, filed Dec. 31, 2021, titled "METHODS AND SYSTEMS FOR SPILLBACK CONTROL OF IN-LINE MIXING OF HYDROCARBON LIQUIDS", which is a continuation of U.S. application Ser. No. 17/247,880, filed Dec. 29, 2020, titled "METHODS AND SYSTEMS FOR INLINE MIXING OF HYDROCARBON LIQUIDS BASED ON DENSITY OR GRAVITY", now U.S. Pat. No. 11,247,184, issued Feb. 15, 2022, which is a Continuation-in-Part of U.S. application Ser. No. 17/247,700, filed Dec. 21, 2020, titled "METHODS AND SYSTEMS FOR INLINE MIXING OF HYDROCARBON LIQUIDS BASED ON DENSITY OR GRAVITY", which claims priority to and the benefit of U.S. Provisional Application No. 63/198,356, filed Oct. 13, 2020, titled "METHODS AND SYSTEMS FOR INLINE MIXING OF PETROLEUM LIQUIDS," U.S. Provisional Application No. 62/705,538, filed Jul. 2, 2020, titled "METHODS AND SYSTEMS FOR INLINE MIXING OF PETROLEUM LIQUIDS", and U.S. Provisional Application No. 62/954,960, filed Dec. 30, 2019, titled "METHOD AND APPARATUS FOR INLINE MIXING OF HEAVY CRUDE", the disclosures of which are incorporated herein by reference in their entirety. U.S. application Ser. No. 17/247,880 is also a Continuation-in-Part of U.S. application Ser. No. 17/247,704, filed Dec. 21, 2020, titled "METHODS AND SYSTEMS FOR INLINE MIXING OF HYDROCARBON LIQUIDS", now U.S. Pat. No. 10,990,114, issued Apr. 27, 2021, which claims priority to and the benefit of U.S. Provisional Application No. 63/198,356, filed Oct. 13, 2020, titled "METHODS AND SYSTEMS FOR INLINE MIXING OF PETROLEUM LIQUIDS", U.S. Provisional Application No. 62/705,538, filed Jul. 2, 2020, titled "METHODS AND SYSTEMS FOR INLINE MIXING OF PETROLEUM LIQUIDS", and U.S. Provisional Application No. 62/954,960, filed Dec. 30, 2019, titled "METHOD AND APPARATUS FOR INLINE MIXING OF HEAVY CRUDE", the disclosures of which are incorporated herein by reference in their entireties.

In the drawings and specification, several embodiments of systems and methods to provide operation of a pump at an efficiency point during in-line mixing of hydrocarbon liquids have been disclosed, and although specific terms are employed, the terms are used in a descriptive sense only and not for purposes of limitation. Embodiments of systems and methods have been described in considerable detail with specific reference to the illustrated embodiments. However, it will be apparent that various modifications and changes may be made within the spirit and scope of the embodiments of systems and methods as described in the foregoing specification, and such modifications and changes are to be considered equivalents and part of this disclosure.

What is claimed is:

1. A method of operating a pump at an efficiency point during an in-line blending operation, the method comprising:

upon an initiation of an in-line blending operation:

discharging, via a pump, a fluid from a tank at a specified flow rate to a main control valve and a spillback loop;

determining a current pump efficiency point based on a best efficiency point and current pump speed on a pump curve; and in response to a determination that the current pump efficiency point is outside of a pre-selected range from the best efficiency point on the pump curve, adjusting, to drive the pump to operate within the pre-selected range such that the pump consumes less energy, one or more of:

(1) the specified flow rate of the pump, (2) an open position of the main control valve to maintain a flow rate of a first portion of the fluid from the main control valve, and (3) an open position of a spillback control valve of the spillback loop to control a flow rate of a second portion of fluid in the spillback loop.

2. The method of claim 1, further comprising:

measuring the flow rate of the first portion of the fluid flowing from the main control valve; and measuring the flow rate, defined by the open position of a spillback control valve positioned on the spillback loop, of the second portion of the fluid flowing through the spillback loop.

3. The method of claim 2, further comprising:

transporting one or more additional fluids from one or more additional tanks to a mixing pipe in fluid communication with the main control valve; and admixing, in the mixing pipe, (1) the first portion of the fluid flowing from the main control valve and (2) the one or more additional fluids from the one or more additional tanks.

4. The method of claim 3, further comprising:

measuring a blend flow rate of the blend of (1) the first portion of the fluid flowing from the main control valve and (2) the one or more additional fluids from the one or more additional tanks; and in response to a ratio of (a) the blend flow rate and (b) the flow rate of the first portion of the fluid flowing from the main control valve being different than a pre-set blend ratio, adjusting the blend ratio by one or more of:

(1) the specified flow rate of the pump, (2) the main control valve's open position, or (3) the spillback control valve's open position.

5. The method of claim 4, wherein adjustment based on a difference between the pre-set blend ratio and the ratio of (a) the blend flow rate and (b) the flow rate of the first portion of the fluid flowing from the main control valve, occurs prior to adjustment based on the pump efficiency point being less than (1) the flow rate of the first portion of the fluid flowing from the main control valve and (2) the flow rate of the second portion of the fluid flowing through the spillback loop.

6. The method of claim 4, wherein the blend flow rate results in part from force of gravity on a flow rate of the one or more additional fluids from the one or more additional tanks.

7. The method of claim 1, wherein adjustment of the spillback control valve's open position increases or decreases the second portion of the fluid based on whether the spillback control valve's open position is increased or decreased, respectively.

8. The method of claim 1, wherein the best efficiency point is a pre-set constant value based on a model of the pump, and wherein the best efficiency point is further based on previous pump events and historical data.

9. The method of claim 8, wherein the previous pump events include pump cavitation, pump operating hours, pump maintenance events, and pump operation over or under a selected percentage of the best efficiency point.

10. The method of claim 1, wherein the fluid comprises one or more hydrocarbons.

11. The method of claim 1, wherein the pre-selected range includes about 40% to about 120% of the best efficiency point.

12. An in-line fluid mixing system positioned at a tank farm to admix hydrocarbon liquids from a plurality of tanks into a single pipeline, the in-line fluid mixing system comprising:

a first tank positioned at a tank farm containing a first fluid therein;

a pump in fluid communication with the tank and configured to control a flow rate of the first fluid from the tank;

a main control valve to receive a first portion of the first fluid from the pump and configured to control a flow rate of the first portion of the first fluid to a mixing pipe;

a spillback loop including a spillback control valve configured to control the flow rate of the first fluid by diverting a second portion of the first fluid from the pump and diverting the second portion of the first fluid back to the pump such that the pump consumes less energy, the second portion of the first fluid based on a difference of: (1) a best efficiency point of the pump on a pump curve and (2) a current pump efficiency point of the pump on the pump curve defined by the best efficiency point and pump speed; and a second tank positioned at the tank farm containing a second fluid therein and in fluid communication with the mixing pipe to thereby transport the second fluid to the mixing pipe to form a mixture with the first portion of the first fluid and the second fluid.

13. The in-line fluid mixing system of claim 12, further comprising:

a first meter positioned along the spillback loop and upstream of the spillback control valve and to measure a flow rate of the second portion of the first fluid;

a second meter positioned along the mixing pipe, downstream of the main control valve, and upstream of a connection point between the second tank and mixing pipe, the second meter to measure a flow rate of the first portion of the first fluid; and a third meter positioned along the mixing pipe and downstream of the connection point between the second tank and mixing pipe, the third meter to measure a flow rate of the mixture.

14. The in-line fluid mixing system of claim 12, wherein the flow rate of the first portion of the first fluid is a based on a pre-selected mix ratio and an open position of the main control valve.

15. The in-line fluid mixing system of claim 12, wherein the diverted portion of the first fluid is based on an open position of the spillback control valve, the flow rate of the diverted portion of the first fluid, the flow rate of the first portion of the first fluid, the current pump efficiency point, and best efficiency point.

16. The in-line mixing system of claim 12, wherein, if the current pump efficiency point is less than or greater than a pre-selected range of percentages of the best efficiency point, one or more of the spillback control valve position and main control valve position are adjusted.

17. The in-line mixing system of claim 16, wherein the current pump efficiency point is determined continuously, substantially continuously, or intermittently.

18. The in-line mixing system of claim 16, wherein the flow rate of the diverted portion of the first fluid and the flow rate of the remaining portion of the first fluid fluctuates over time based on a fluid level of the first tank.

19. The in-line mixing system of claim 12, wherein the first fluid and second fluid each comprise one or more of a petroleum liquid or renewable liquid.

20. The in-line fluid mixing system of claim 12, wherein the second portion of the first fluid is further based on a difference of the current pump efficiency point from the best efficiency point within a pre-selected range of the best efficiency point.

21. A pump efficiency point operation system positioned at a tank farm to drive a pump to operate at an efficiency point, the system comprising:

a tank positioned at a tank farm containing a fluid therein;

a pump including an input and an output, the input of the pump connected to the tank, the pump to control flow rate of a first fluid from the tank;

a main control valve connected to the pump and to further control flow rate of the first fluid from the pump to a mixing pipe; and a spillback loop connected upstream of the pump and downstream of the pump, the spillback loop including a spillback control valve to control flow rate of the fluid by diverting a portion of the fluid from the output of the pump to the input of the pump to drive the pump to consume less energy, the diverted portion of the fluid based on a difference between a best efficiency point on a pump curve and a current pump efficiency point and speed of the pump on the pump curve.

22. The system of claim 21, wherein the mixing pipe connects to one or more additional tanks containing a different fluid therein and configured to mix the fluid from the tank and the different fluid from the one or more additional tanks.

23. The system of claim 21, wherein the pump controls the flow rate of the first fluid from the tank by operating at a set speed based on the best efficiency point, the current efficiency point, and the current pump speed.

24. The system of claim 23, wherein a portion of the fluid flowing to the main control valve is based on an open position of the spillback control valve.

25. The system of claim 23, wherein a portion of the fluid flowing from the main control valve is based on an open position of the spillback control valve and an open position of the main control valve.

26. The system of claim 21, further comprising:

a spillback meter positioned along the spillback loop and upstream of the spillback control valve, the spillback meter to measure a flow rate of fluid flowing through the spillback loop; and a main meter positioned proximate and downstream the main control valve, the main meter to measure a flow rate of fluid flowing through the main control valve.

27. The system of claim 26, wherein a corrected ratio for driving the pump to operate within a pre-selected range of percentages of the best efficiency point is determined.

28. The system of claim 27, wherein the corrected ratio is based on the flow rate of fluid flowing through the spillback loop and the flow rate of fluid flowing through the main control valve.

29. The system of claim 28, wherein adjustment of one or more of the spillback control valve and main control valve is based on the corrected ratio.

30. The system of claim 21, wherein the diverted portion of the fluid is further based on a difference of the current pump efficiency point from the best efficiency point within a pre-selected range of the best efficiency point.

* * * * *